US012691973B2

(12) United States Patent
Li et al.

(10) Patent No.: US 12,691,973 B2
(45) Date of Patent: Jul. 28, 2026

(54) AUTOMATIC INTERNAL TRANSMISSION AND BICYCLE

(71) Applicant: GUANGDONG LOFANDI INTELLIGENT TECHNOLOGY CO., LTD, Foshan (CN)

(72) Inventors: Jichu Li, Foshan (CN); Jiehuang Lin, Foshan (CN)

(73) Assignee: GUANGDONG LOFANDI INTELLIGENT TECHNOLOGY CO., LTD., Foshan (CN)

( * ) Notice: Subject to any disclaimer, the term of this patent is extended or adjusted under 35 U.S.C. 154(b) by 0 days.

(21) Appl. No.: 18/725,778

(22) PCT Filed: Nov. 9, 2022

(86) PCT No.: PCT/CN2022/130802
§ 371 (c)(1),
(2) Date: Jun. 30, 2024

(87) PCT Pub. No.: WO2023/197589
PCT Pub. Date: Oct. 19, 2023

(65) Prior Publication Data
US 2025/0100649 A1 Mar. 27, 2025

(30) Foreign Application Priority Data
Apr. 12, 2022 (CN) .......................... 202210380344.4

(51) Int. Cl.
*B62M 11/18* (2006.01)
*B62M 11/16* (2006.01)

(52) U.S. Cl.
CPC ............. *B62M 11/16* (2013.01); *B62M 11/18* (2013.01)

(58) Field of Classification Search
CPC ............................... B62M 11/16; B62M 11/18
See application file for complete search history.

(56) References Cited

U.S. PATENT DOCUMENTS 3,327,565 A 6/1967 Grattan

FOREIGN PATENT DOCUMENTS

CN 106523608 A 3/2017
CN 106627975 A * 5/2017 ............ B62M 11/18
(Continued)

OTHER PUBLICATIONS

EP 22937221 office action filed Apr. 30, 2025, pp. 1-3. (Year: 2025).*
(Continued)

*Primary Examiner* — Tisha D Lewis
(74) *Attorney, Agent, or Firm* — Yue (Robert) Xu; Apex Attorneys at Law, LLP

(57) ABSTRACT

An automatic internal transmission and a bicycle are provided. The automatic internal transmission includes a hub shaft, an input mechanism, an output mechanism, a transmission mechanism having a first planetary gear train and a second planetary gear train, and an automatic shifting control mechanism having a clutch control unit and a centrifugal block being connected to the output mechanism and the clutch control unit. The centrifugal block can rotate relative to the output mechanism to a first state in a first direction, to drive the clutch control unit to rotate, so that a driving force is transmitted via the first planetary gear train. The centrifugal block can further rotate relative to the output mechanism to a second state in the first direction, to drive the clutch control unit to further rotate, so that the driving force is transmitted via the second planetary gear train.

20 Claims, 21 Drawing Sheets

(56)                     References Cited

FOREIGN PATENT DOCUMENTS

| | | | | | |
|---|---|---|---|---|---|
| CN | 206361099 U | * | 7/2017 | ............... | F16H 3/66 |
| CN | 107588161 A | | 1/2018 | | |
| CN | 108974242 A | | 12/2018 | | |
| CN | 108974243 A | | 12/2018 | | |
| CN | 113859419 A | * | 12/2021 | ............ | B62M 11/18 |
| CN | 113895558 A | * | 1/2022 | ............ | B62M 11/16 |
| CN | 114056480 A | | 2/2022 | | |
| CN | 114132427 A | * | 3/2022 | ............ | B62M 11/18 |
| CN | 114228897 A | * | 3/2022 | ............ | B62M 11/16 |
| CN | 114524049 A | | 5/2022 | | |
| CN | 114537579 A | | 5/2022 | | |
| CN | 218141973 U | | 12/2022 | | |
| EP | 2028096 A1 | | 2/2009 | | |
| FR | 911358 A | * | 7/1946 | ............ | B62M 11/14 |
| JP | 401291 A | | 1/1965 | | |
| WO | 2020085754 A1 | | 4/2020 | | |

OTHER PUBLICATIONS

JP 2024525830 office action filed Apr. 15, 2025, pp. 1-3. (Year: 2025).*

International Search Report for PCT/CN2022/130802 mailed Dec. 15, 2022, ISA/CN.

European Search Report issued on Apr. 30, 2025 for the European counterpart application No. 22937221.4.

Japanese First Office Action issued on Apr. 15, 2025 for the Japanese counterpart application No. 2024-525830.

Chinese First Office Action issued on May 19, 2025 for the Chinese priority application No. 202210380344.4.

Metalworking (Cold Working), 2008 Annual Table of Contents Index, Issue 24, published on Dec. 15, 2008.

* cited by examiner 281    280

293

290    291

AUTOMATIC INTERNAL TRANSMISSION AND BICYCLE

The present application is the national phase of International Application No. PCT/CN2022/130802, titled "AUTOMATIC INTERNAL TRANSMISSION AND BICYCLE", filed on Nov. 9, 2022, which claims the priority to Chinese Patent Application No. 202210380344.4, titled "AUTOMATIC INTERNAL TRANSMISSION AND BICYCLE", filed with the China National Intellectual Property Administration on Apr. 12, 2022, the entire disclosures thereof are incorporated herein by reference.

FIELD

The present application relates to the technical field of internal transmission of bicycle, and in particular to an automatic internal transmission and a bicycle.

BACKGROUND

A bicycle is also called a pedal cycle or a cycle. When a rider gets on the bicycle, it is powered by pedaling, and is a green and environmentally friendly means of transport. In modern society, the bicycle has become a favorite means of transport and fitness for residents in countries around the world, especially in developed countries. Meanwhile, the focus of the global bicycle industry has shifted from conventional means of transport to sports, mountain and leisure types. In developed countries and regions such as the United States, Europe, Japan or the like, the bicycle has even become a common product for sports, fitness, leisure and entertainment. With the development of technology, the emergence of internal transmission of bicycle makes it more and more convenient for the rider to shift gears.

The internal transmissions in the prior art basically includes a hub shaft, an input mechanism, an output mechanism, a transmission mechanism, a shift control mechanism and other components. The input mechanism is connected to a freewheel of a rear wheel of the bicycle, such that when the internal transmission is mounted to the bicycle, the input mechanism can be driven by the freewheel to rotate. The output mechanism is generally the hub of the rear wheel, such that when the internal transmission is mounted to the bicycle, rotation of the output mechanism can synchronously drive the rear wheel to rotate, and the bicycle moves forwards. The transmission mechanism is arranged between the input mechanism and the output mechanism, and acts as a drive component between the input mechanism and the output mechanism, to transmit the rotational power of the input mechanism to the output mechanism, thereby driving the output mechanism to rotate. Multiple power transmission paths may be provided in the transmission mechanism, and the shift control mechanism is configured to control the transmission mechanism. The shift control mechanism is configured to control engagement between components of the transmission mechanism or engagement between the transmission mechanism and the output mechanism, to achieve shifting of transmission of the bicycle.

As one type of internal transmissions, an automatic internal transmission employs an automatic shift control mechanism. With the automatic shift control mechanism, gear shifting can be achieved automatically as the speed of the bicycle changes, which does not require additional manual adjustment by the rider. The automatic shift control mechanism generally includes a centrifugal block and a clutch control unit. The centrifugal block is generally rotatably connected to the hub, and the clutch control unit is connected to the centrifugal block. When the rotation speed of the hub reaches a certain extent, the centrifugal block is "thrown out" outwards due to the action of a centrifugal force, and the centrifugal block, when being "thrown out", drives the clutch control unit to rotate, then components in the control transmission mechanism are controlled to be combined with each other through the clutch control unit, or the transmission mechanism and the output mechanism are combined with each other through the clutch control unit, such that the driving force of the input mechanism can be transmitted to the hub via the clutch control unit, thereby achieving automatic gear shifting.

When the automatic internal transmission has multiple gears, multiple sets of centrifugal block and clutch control unit are usually provided in the automatic internal transmission, and a centrifugal block in each set is connected to a corresponding clutch control unit.

However, in the automatic internal transmission in the prior art, the centrifugal blocks and the clutch control units for controlling different gears are independent to each other. During specific adjustment process, different centrifugal blocks are subjected to the centrifugal force and thrown out, to control different clutch control units to rotate, thereby achieving shifting between multiple gears. In use, an "overshifting" situation is likely to arise. For example, a centrifugal block for controlling a high speed gear has already been "thrown out" before a centrifugal block for controlling a medium speed gear is "thrown out", such that the automatic internal transmission is shifted from a low speed gear to another gear skipping the medium gear, which affects cycling experience of the rider.

SUMMARY

To solve the technical problem that, the "overshifting" situation is likely to arise during gear shifting an automatic internal transmission in the prior art, which affects cycling experience of the rider, an automatic internal transmission is provided according to the present application, to effectively prevent the "overshifting" situation to better ensure the cycling experience of the rider.

An automatic internal transmission includes a hub shaft, an input mechanism, an output mechanism, a transmission mechanism and an automatic shift control mechanism, where the input mechanism and the output mechanism are both rotatably mounted to the hub shaft, and the input mechanism is configured to provide a driving force to drive the output mechanism to rotate;

the transmission mechanism is mounted to the hub shaft, and is located between the input mechanism and the output mechanism; where the transmission mechanism at least includes a first planetary gear train and a second planetary gear train;

the automatic shift control mechanism includes a centrifugal block and a clutch control unit, the centrifugal block is rotatably connected to the output mechanism, and the centrifugal block is connected to the clutch control unit;

the centrifugal block is configured to rotate with respect to the output mechanism along a first direction to a first state, to drive the clutch control unit to rotate, to make the driving force transmitted by the input mechanism be transmitted to the output mechanism via the first planetary gear train; and the centrifugal block is configured to further rotate with respect to the output mechanism along the first direction to a second state, to make the clutch control unit to further rotate, to make the driving force transmitted by the input mechanism be transmitted to the output mechanism via the second planetary gear train.

Preferably, the clutch control unit includes a synchronization ring, a control sleeve and a clutch controller, where the centrifugal block is connected to the synchronization ring, the control sleeve is connected to the synchronization ring, the clutch controller is located between the transmission mechanism and the output mechanism, and the centrifugal block is configured to drive the synchronization ring to rotate, so as to drive the control sleeve to rotate to control the clutch controller; and where in the first state, the control sleeve is configured to control the clutch controller to combine the first planetary gear train with the output mechanism; and in the second state, the control sleeve is configured to control the clutch controller to combine the second planetary gear train with the output mechanism.

Preferably, the clutch controller includes a hub bush, a first pawl and a second pawl, the hub bush is connected to the output mechanism, and the first pawl and the second pawl are each rotatably connected to the hub bush; where in the first state, the control sleeve is configured to control the first pawl to be combined with the first planetary gear train; and in the second state, the control sleeve is configured to control the second pawl to be combined with the second planetary gear train.

Preferably, the first pawl and the second pawl are arranged spaced apart from each other along an axial direction, the control sleeve is provided with a first control groove and a second control groove, the first control groove runs through the control sleeve in a radial direction, and the first control groove is arranged in correspondence to the first pawl in the axial direction, the second control groove runs through the control sleeve in the radial direction, and the second control groove is arranged in correspondence to the second pawl in the axial direction; where in the first state, an inner wall of the first control groove abuts against the first pawl to press the first pawl downwards, to make the first pawl pass through the first control groove to be combined with the first planetary gear train; and in the second state, an inner wall of the second control groove abuts against the second pawl to press the second pawl downwards, to make the second pawl pass through the second control groove to be combined with the second planetary gear train.

Preferably, the synchronization ring includes a synchronization ring body, a centrifugal block connection protrusion and a control sleeve connection protrusion, where the centrifugal block connection protrusion is provided at one end of the synchronization ring body in an axial direction; at least two centrifugal block connection protrusions are provided, and the centrifugal block is connected to the centrifugal block connection protrusion; the control sleeve connection protrusion is provided at the other end of the synchronization ring body in the axial direction, and the control sleeve is connected to the control sleeve connection protrusion.

Preferably, the automatic internal transmission further includes a first resilient reset member, where the first resilient reset member is connected to the output mechanism, and is configured to provide a first restoring force, via its own resilience, to the centrifugal block, to make the centrifugal block be restored along a second direction and kept in an initial state; where the second direction and the first direction are two opposite directions.

Preferably, the automatic internal transmission further includes a first resilient force adjustment structure, where the first resilient reset member is connected to the output mechanism via the first resilient force adjustment structure;

the first resilient force adjustment structure includes a first adjustment member and a first driving member, the first adjustment member is connected to the first resilient reset member, the first driving member is connected to the output mechanism, and the first driving member is connected to the first adjustment member; the first driving member is configured to drive the first adjustment member to work, to change a deformed state of the first resilient reset member, so as to change the first restoring force acting on the centrifugal block.

Preferably, the first adjustment member is rotatably connected to the output mechanism, the first resilient reset member is a torsion spring, and the first driving member is configured to drive the first adjustment member to rotate, so as to twist the first resilient reset member.

Preferably, the first adjustment member is provided with a first gear, and the first driving member is engaged with the first gear.

Preferably, the first driving member includes a first driving bolt and a driving rack, the output mechanism is provided with a first threaded hole, the first driving bolt is correspondingly mounted at the first threaded hole, the driving rack is engaged with the first gear, and the first driving bolt is configured to drive the driving rack to move, so as to drive the first adjustment member to rotate.

Preferably, the first driving member further includes a first reset spring, where two ends of the first reset spring are connected to the driving rack and the output mechanism respectively, and the first reset spring is configured to provide a restoring force, via its own resilience, to the driving rack.

Preferably, the first driving member includes a rotation plate, a connecting rod and a rotation plate driving rod, the rotation plate is rotatably connected to the output mechanism, and the rotation plate is connected to the first adjustment member via the connecting rod; the rotation plate driving rod is movably mounted to the output mechanism, and the rotation plate driving rod is configured to drive the rotation plate to rotate, so as to make the connecting rod drive the first adjustment member to rotate.

Preferably, the connecting rod is connected to one end of the rotation plate, and a worm wheel structure is provided at another end of the rotation plate, the rotation plate driving rod includes a worm and a driving rod, the worm is engaged with the worm wheel structure, the driving rod is connected to the worm, the driving rod is movably mounted to the output mechanism, and the driving rod is configured to drive the worm to rotate, so as to drive the rotation plate to rotate by cooperation between the worm and the worm wheel structure.

Preferably, the output mechanism is provided with a mounting hole, the driving rod is mounted in the mounting hole, a seal ring is mounted to the driving rod, and the driving rod is in an interference fit with a hole wall of the mounting hole via the seal ring.

Preferably, the rotation plate driving rod is a bolt, the output mechanism is provided with a first threaded hole, and the rotation plate driving rod is correspondingly mounted at the first threaded hole.

Preferably, two ends of the first resilient reset member are connected to the first adjustment member and the centrifugal block respectively.

Preferably, the automatic internal transmission further includes a second resilient reset member and a damping member, where two ends of the second resilient reset member are connected to the damping member and the output mechanism respectively, the damping member is configured to stop the centrifugal block, and the damping member is configured to provide a second restoring force, via resilience of the second resilient reset member, to the centrifugal block, to make the centrifugal block be restored along the second direction and kept in the first state.

Preferably, the automatic internal transmission further includes a second resilient force adjustment structure, where the second resilient reset member is connected to the output mechanism via the second resilient force adjustment structure; where the second resilient force adjustment structure includes a second adjustment member and a second driving member, the second adjustment member is connected to the second resilient reset member, the second driving member is connected to the output mechanism, and the second driving member is connected to the second adjustment member; the second driving member is configured to drive the second adjustment member to work, to change a deformed state of the second resilient reset member, so as to change the second restoring force acting on the centrifugal block by the damping member.

Preferably, the second adjustment member is rotatably connected to the output mechanism, the second resilient reset member is a torsion spring, and the second driving member is configured to drive the second adjustment member to rotate, so as to twist the second resilient reset member.

Preferably, the second adjustment member is provided with a second gear, and the second driving member is engaged with the second gear.

Preferably, the second driving member includes a second driving bolt and a second driving assembly, the output mechanism is provided with a second threaded hole, the second driving bolt is correspondingly mounted at the second threaded hole, the second driving assembly is engaged with the second gear, and the first driving bolt is configured to drive the second driving assembly to work, to drive the second adjustment member to rotate.

Preferably, the second driving assembly includes an oscillating gear and an intermediate gear, the oscillating gear is rotatably connected to the output mechanism, and the intermediate gear is rotatably connected to the output mechanism; the intermediate gear is engaged with the oscillating gear and the second gear respectively, and the second driving bolt is configured to drive the oscillating gear to oscillate to drive the intermediate gear to rotate, so as to rotate the second adjustment member.

Preferably, the second driving member further includes a second reset torsion spring, where two ends of the second reset torsion spring are connected to the oscillating gear and the output mechanism respectively, and the second reset torsion spring is configured to provide a restoring force, via its own resilience, to the oscillating gear.

Preferably, the output mechanism includes a hub body and a mounting base, the mounting base is fixedly connected to the hub body, the first adjustment structure and the second adjustment structure are both connected to the mounting base, and the centrifugal block is rotatably connected to the mounting base.

Preferably, the mounting base is provided with a slide groove, an opening is provided at an end of the slide groove, and the slide groove extends along a rotational direction of the centrifugal block, where the centrifugal block includes a centrifugal block body and a centrifugal block protrusion, the centrifugal block body is rotatably connected to the mounting base, the centrifugal block protrusion is connected to the centrifugal block body, the damping member and the centrifugal block body are arranged in a staggered manner along an axial direction, the centrifugal block protrusion is located in the slide groove, and the centrifugal block protrusion is allowed to slide out of the slide groove through the opening when the centrifugal block is rotated under a centrifugal force; and the damping member is correspondingly located at the opening, and is configured to stop the centrifugal block protrusion.

Preferably, the automatic internal transmission further includes a damping member attraction unit, the damping member attraction unit is connected to the mounting base and is proximate to the opening, and the damping member attraction unit is configured to attract the damping member, to make the damping member be at an initial position.

Preferably, in the first state, the centrifugal block protrusion is proximate to the opening, and the damping member attraction unit is further configured to attract the centrifugal block protrusion.

Preferably, the automatic internal transmission further includes a centrifugal block attraction unit, the centrifugal block attraction unit is connected to the output mechanism, and is configured to attract the centrifugal block, to keep the centrifugal block in the second state.

A bicycle is provided, including the automatic internal transmission according to any one of the above solutions, and the automatic internal transmission is mounted to a driving wheel of the bicycle body.

Compared with the prior art, the automatic internal transmission according to the present application includes a hub shaft, an input mechanism, an output mechanism, a transmission mechanism and an automatic shift control mechanism; the input mechanism and the output mechanism are both rotatably mounted to the hub shaft, and the input mechanism is configured to provide a driving force to drive the output mechanism to rotate; the transmission mechanism is mounted to the hub shaft, and is located between the input mechanism and the output mechanism; where the transmission mechanism at least includes a first planetary gear train and a second planetary gear train; the automatic shift control mechanism includes a centrifugal block and a clutch control unit, the centrifugal block is rotatably connected to the output mechanism, and the centrifugal block is connected to the clutch control unit; the centrifugal block is configured to rotate with respect to the output mechanism along a first direction to a first state, thereby driving the clutch control unit to rotate, such that the driving force transmitted by the input mechanism is transmitted to the output mechanism via the first planetary gear train; and the centrifugal block is configured to further rotate with respect to the output mechanism along the first direction to a second state, thereby driving the clutch control unit to further rotate, such that the driving force transmitted by the input mechanism is transmitted to the output mechanism via the second planetary gear train. The automatic internal transmission controls the clutch control unit to rotate to different angles along the same direction via the centrifugal block, to achieve gear shifting and adjustment, such that the "overshifting" situation will not arise during gear shifting, which makes the cycling experience of the rider better.

BRIEF DESCRIPTION OF THE DRAWINGS

For more clearly illustrating embodiments of the present application or the technical solutions in the conventional technology, drawings referred to describe the embodiments or the conventional technology will be briefly described hereinafter. Apparently, the drawings in the following description are only some examples of the present application, and for those skilled in the art, other drawings may be obtained based on these drawings without any creative efforts.

DETAILED DESCRIPTION OF THE EMBODIMENTS

Figure 1:
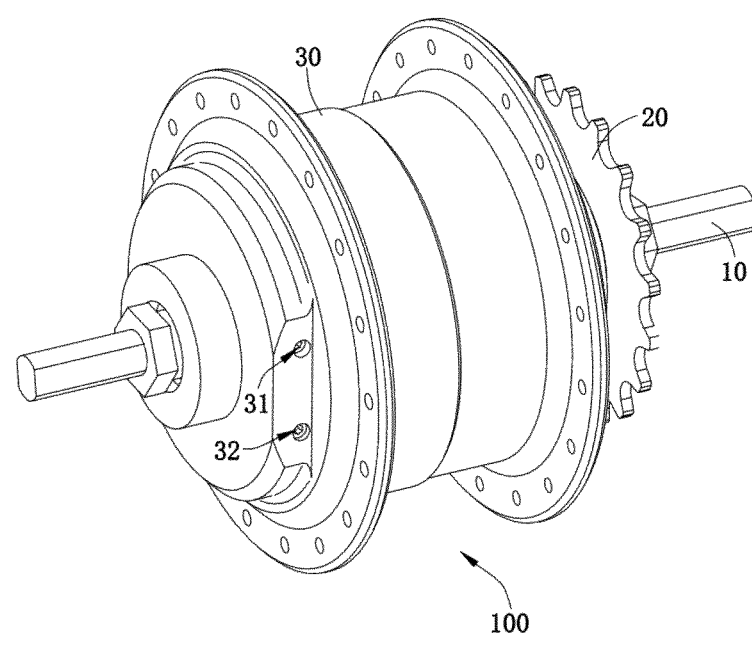
FIG. 1 is a schematic perspective view showing the structure of an automatic internal transmission according to an embodiment.
Figure 2:
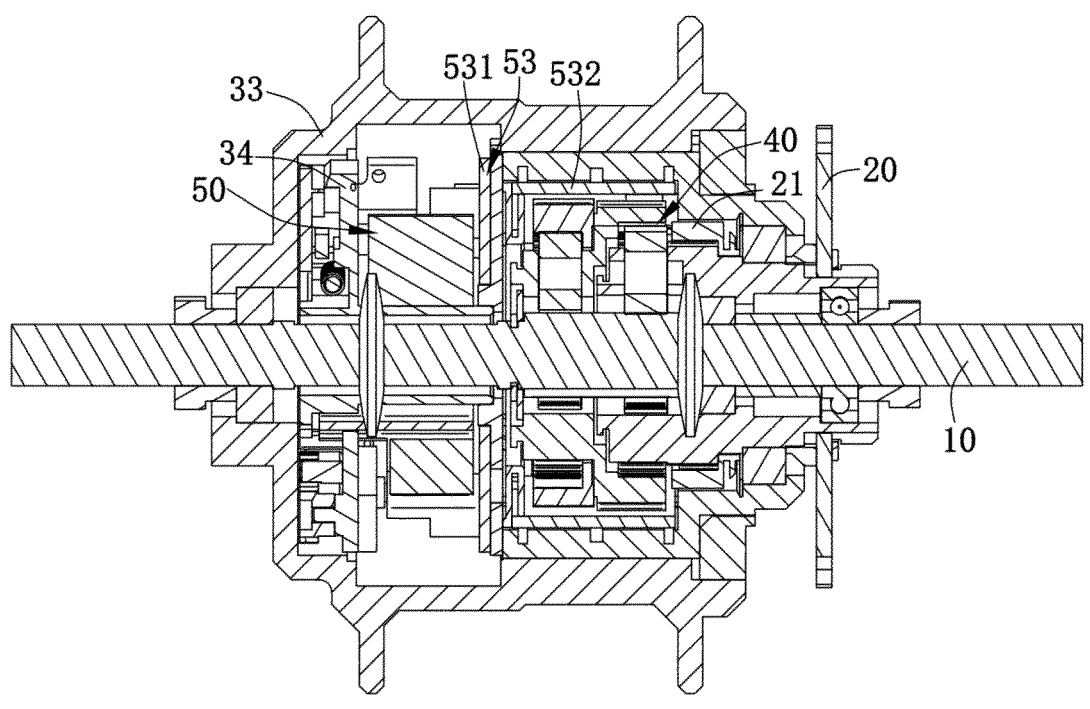
FIG. 2 is a schematic sectional view showing the structure of the automatic internal transmission in FIG. 1.
Figure 3:
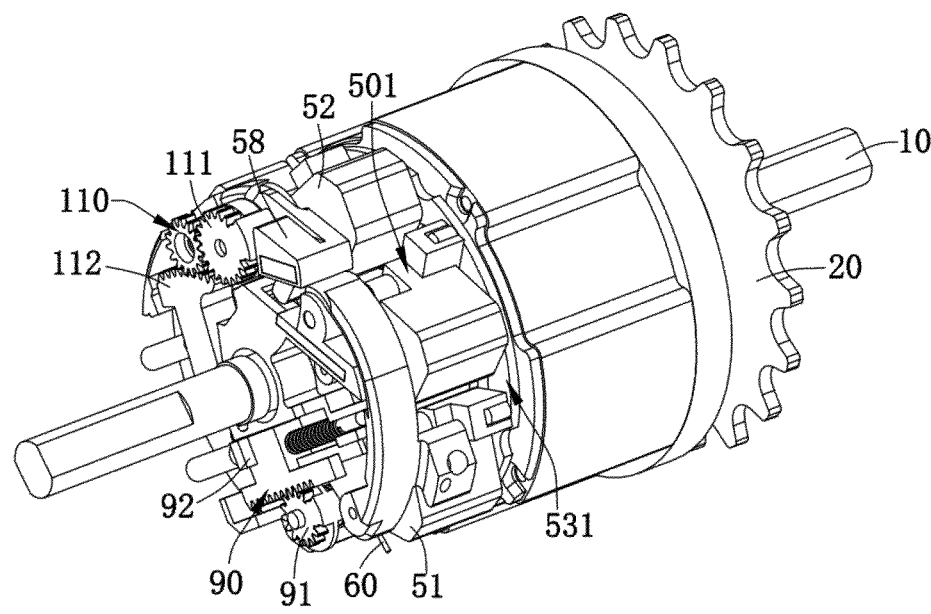
FIG. 3 is a schematic perspective view showing the structure of a part of components of the automatic internal transmission in FIG. 1.
Figure 4:
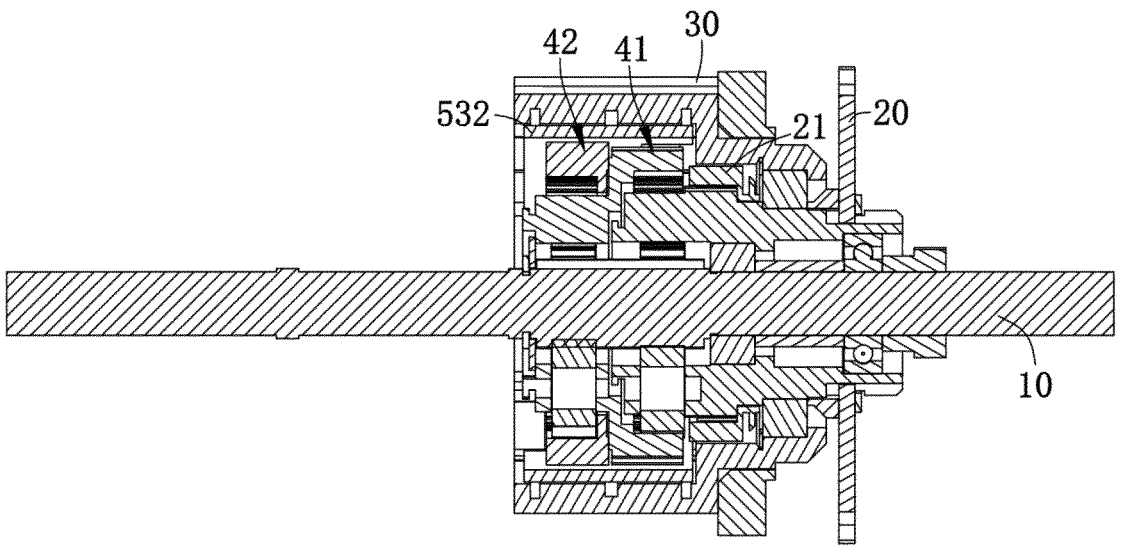
FIG. 4 is a schematic sectional view showing the structure of a part of components of the automatic internal transmission in FIG. 2.
Figure 5:
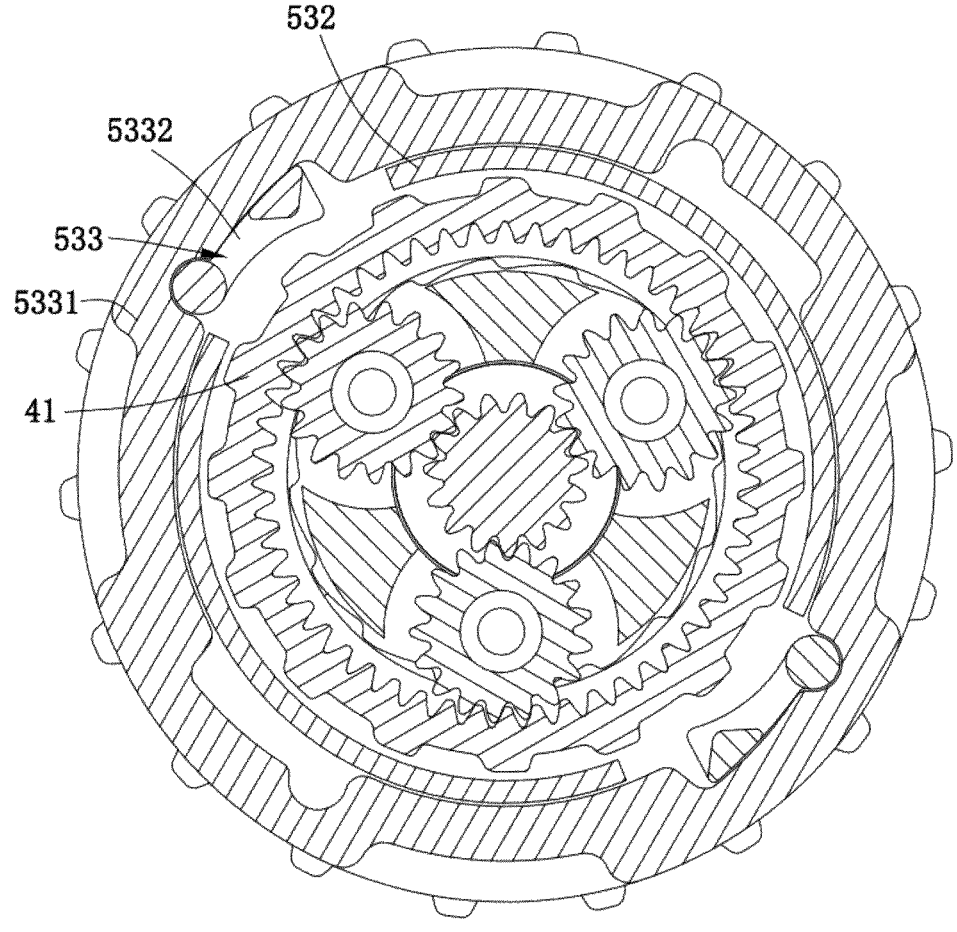
FIG. 5 is a schematic sectional view showing the structure of a first planetary gear train and a clutch control unit in FIG. 4 from another perspective.
Figure 6:
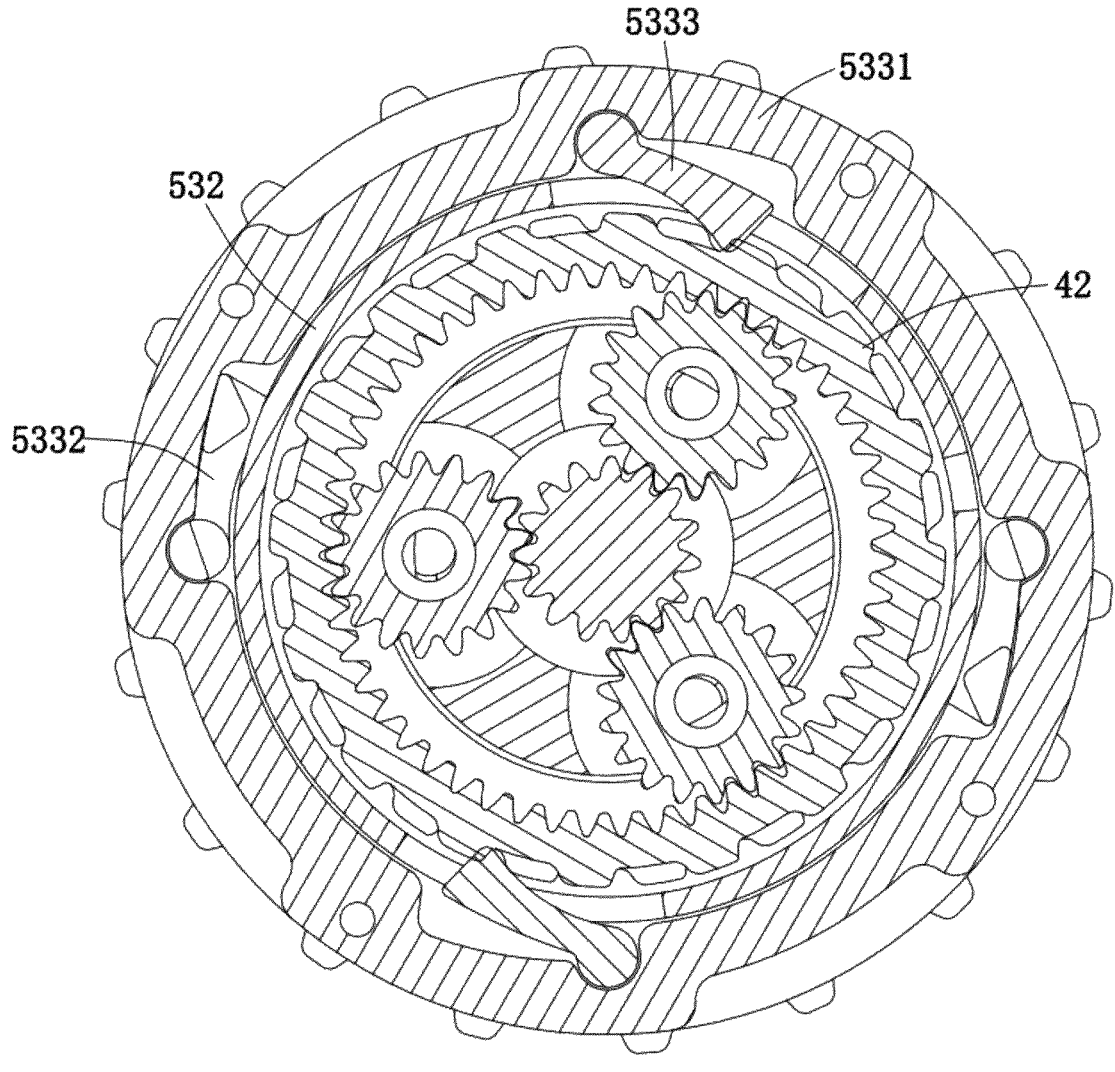
FIG. 6 is a schematic sectional view showing the structure of a second planetary gear train and the clutch control unit in FIG. 4 from another perspective.
Figure 7:
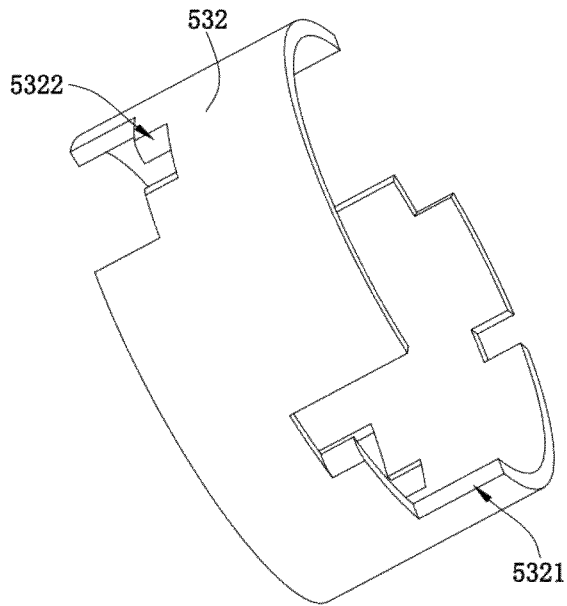
FIG. 7 is a schematic perspective view showing the structure of a control sleeve in FIG. 5.
Figure 8:
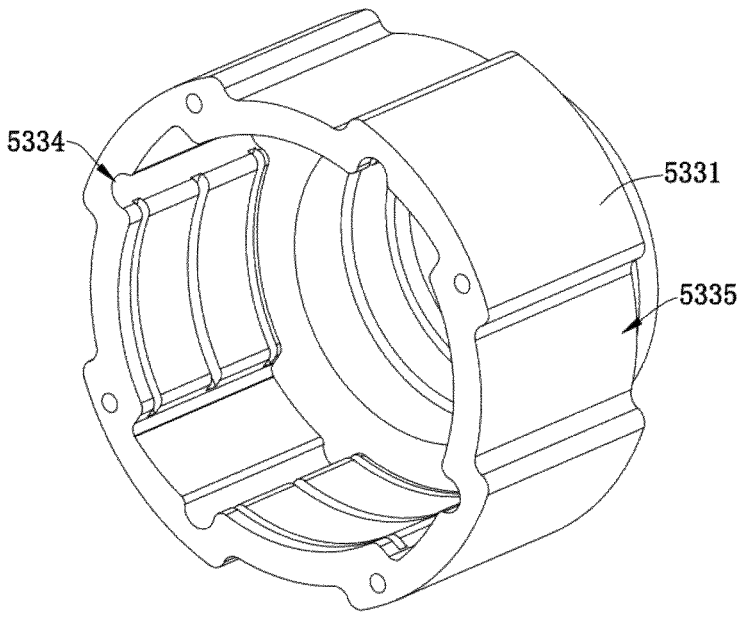
FIG. 8 is a schematic perspective view showing the structure of a hub bush in FIG. 5.
Figure 9:
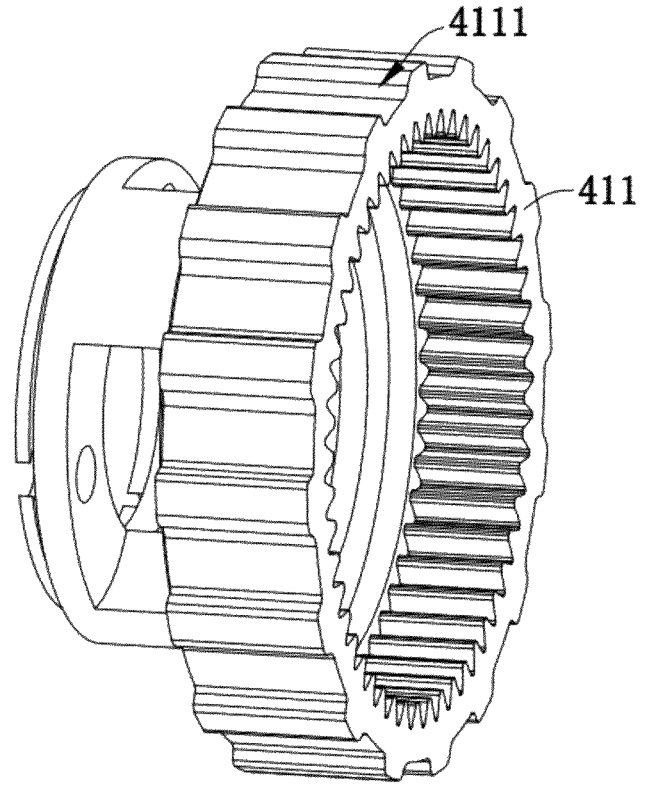
FIG. 9 is a schematic perspective view showing the structure of a ring gear of the first planetary gear train in FIG. 5.
Figure 10:
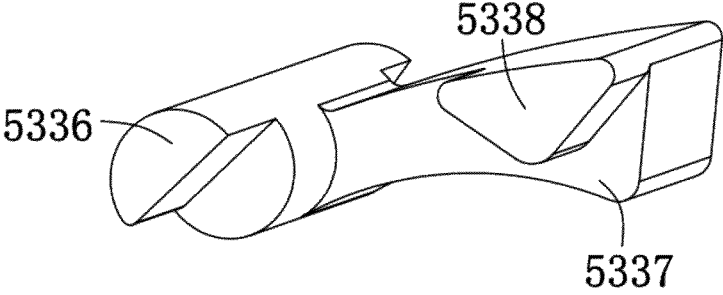
FIG. 10 is a schematic perspective view showing the structure of a first pawl in FIG. 5.
Figure 11:
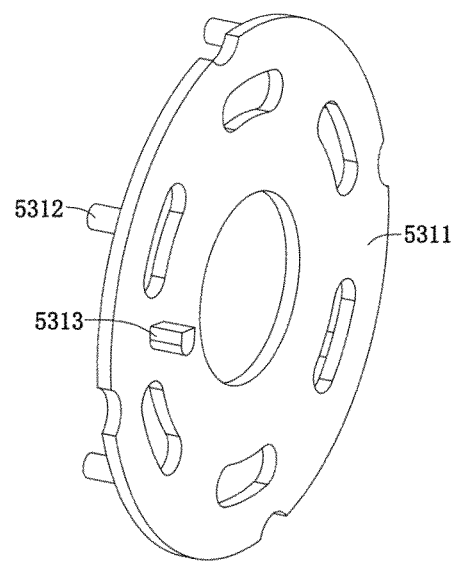
FIG. 11 is a schematic perspective view showing the structure of a synchronization ring in FIG. 2.
Figure 12:
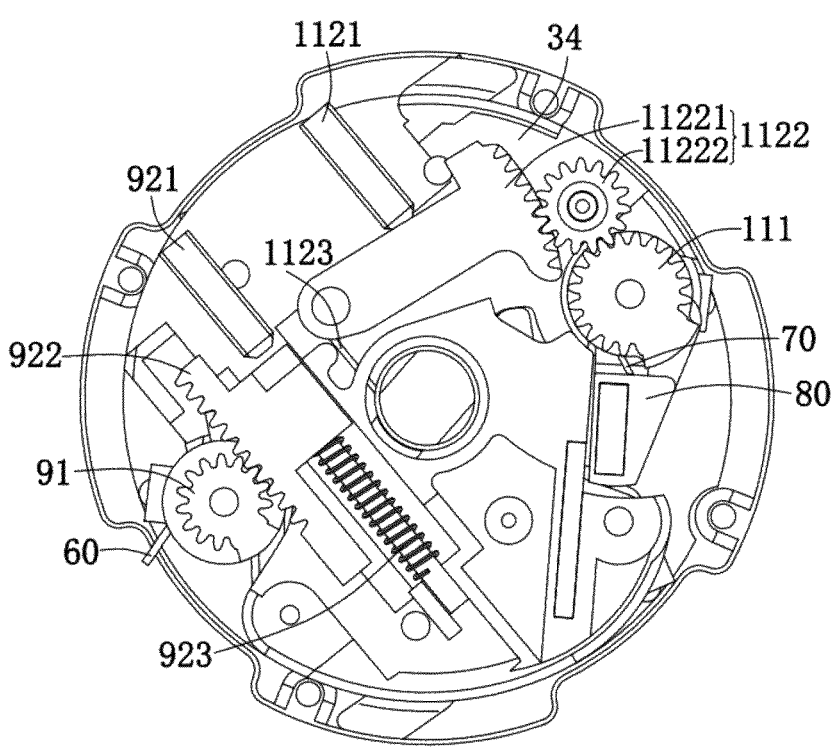
FIG. 12 is a schematic planar view showing the structure of a part of the components of the automatic internal transmission in FIG. 1.
Figure 13:
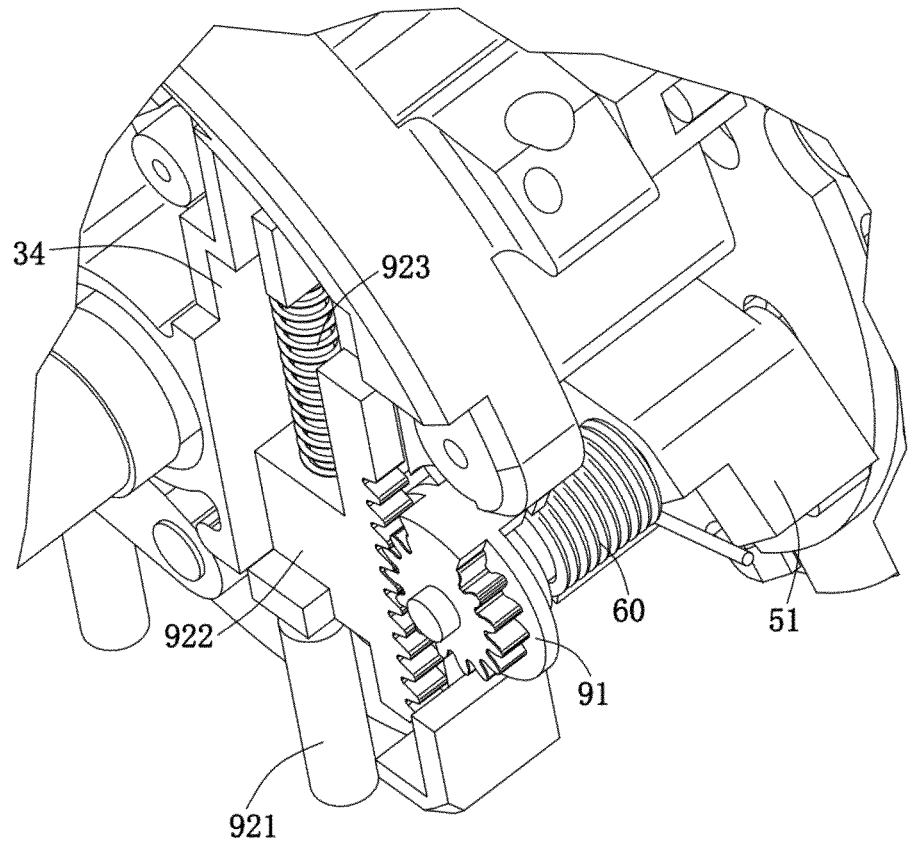
FIG. 13 is a schematic perspective view showing the structure of a part of the components of the automatic internal transmission in FIG. 1.
Figure 14:
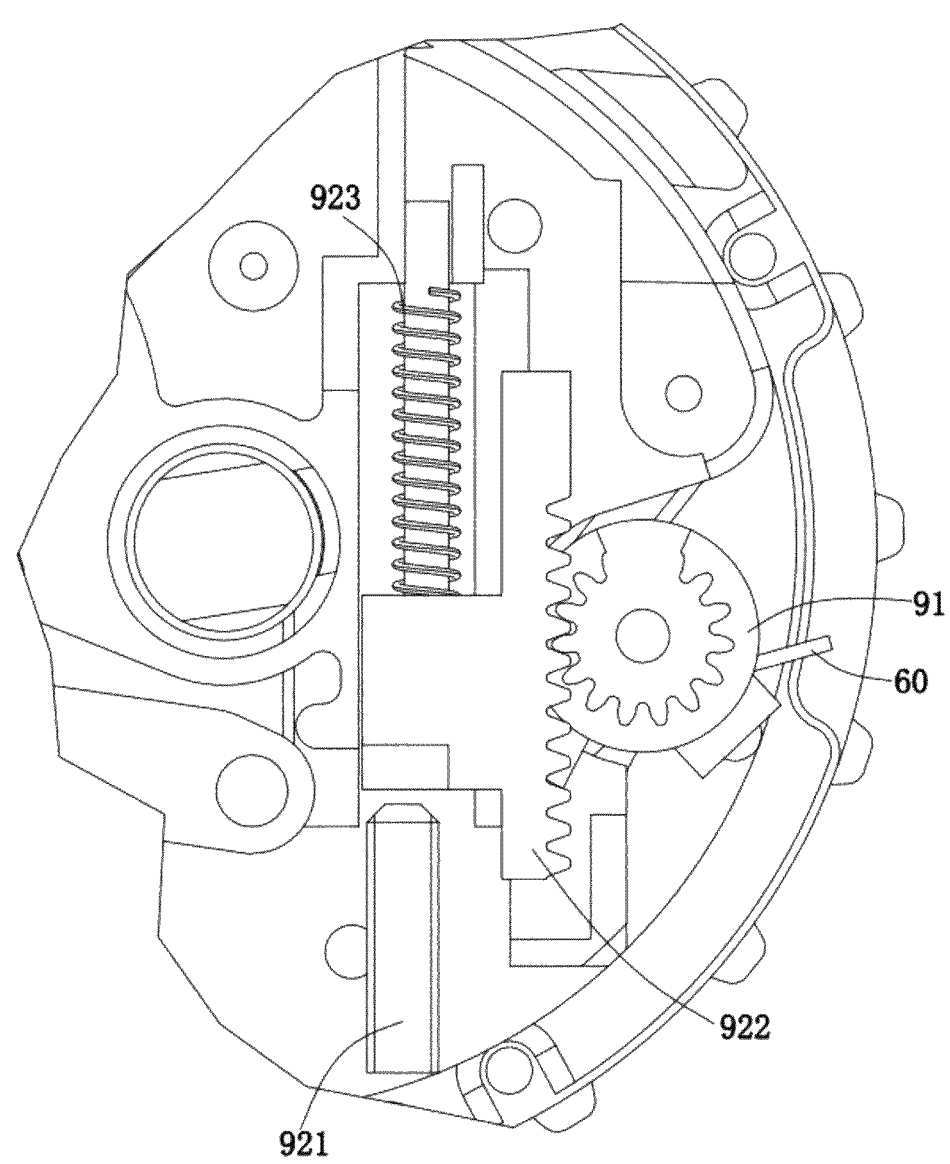
FIG. 14 is a schematic planar view showing the structure of the components in FIG. 13.
Figure 15:
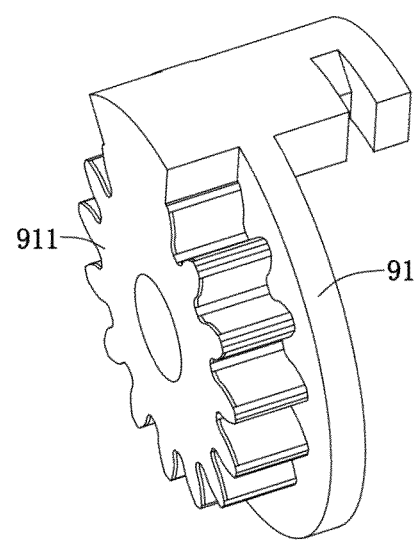
FIG. 15 is a schematic perspective view showing the structure of a first adjustment member in FIG. 13.
Figure 16:
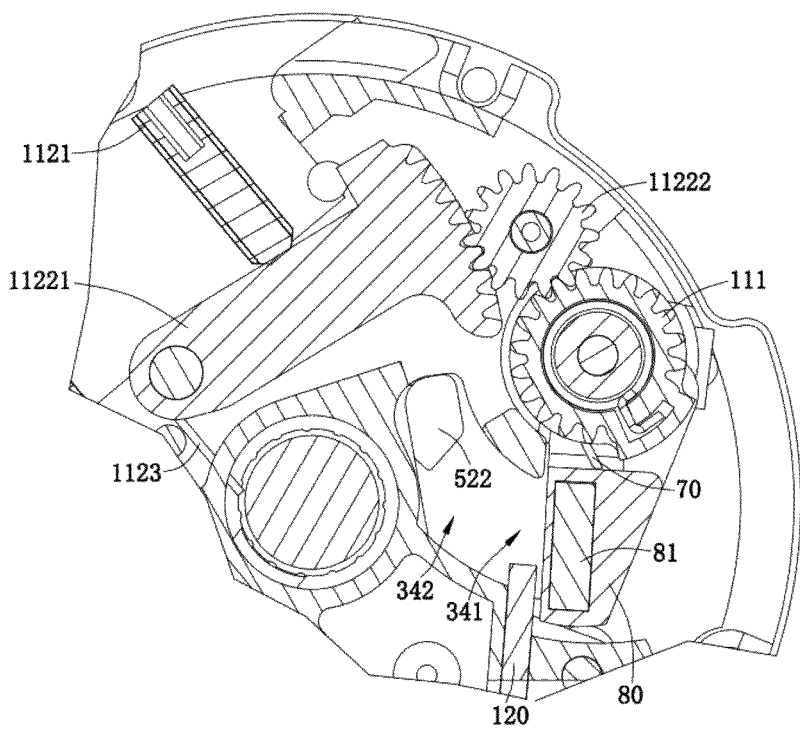
FIG. 16 is a schematic planar view showing the structure of a part of components of the automatic internal transmission in FIG. 1.
Figure 17:
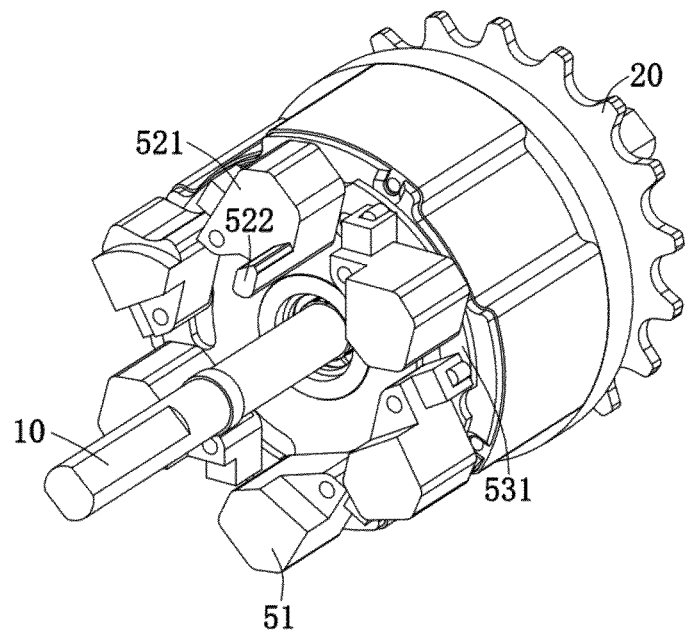
FIG. 17 is a schematic perspective view showing the structure of a part of components of the automatic internal transmission in FIG. 1.
Figure 18:
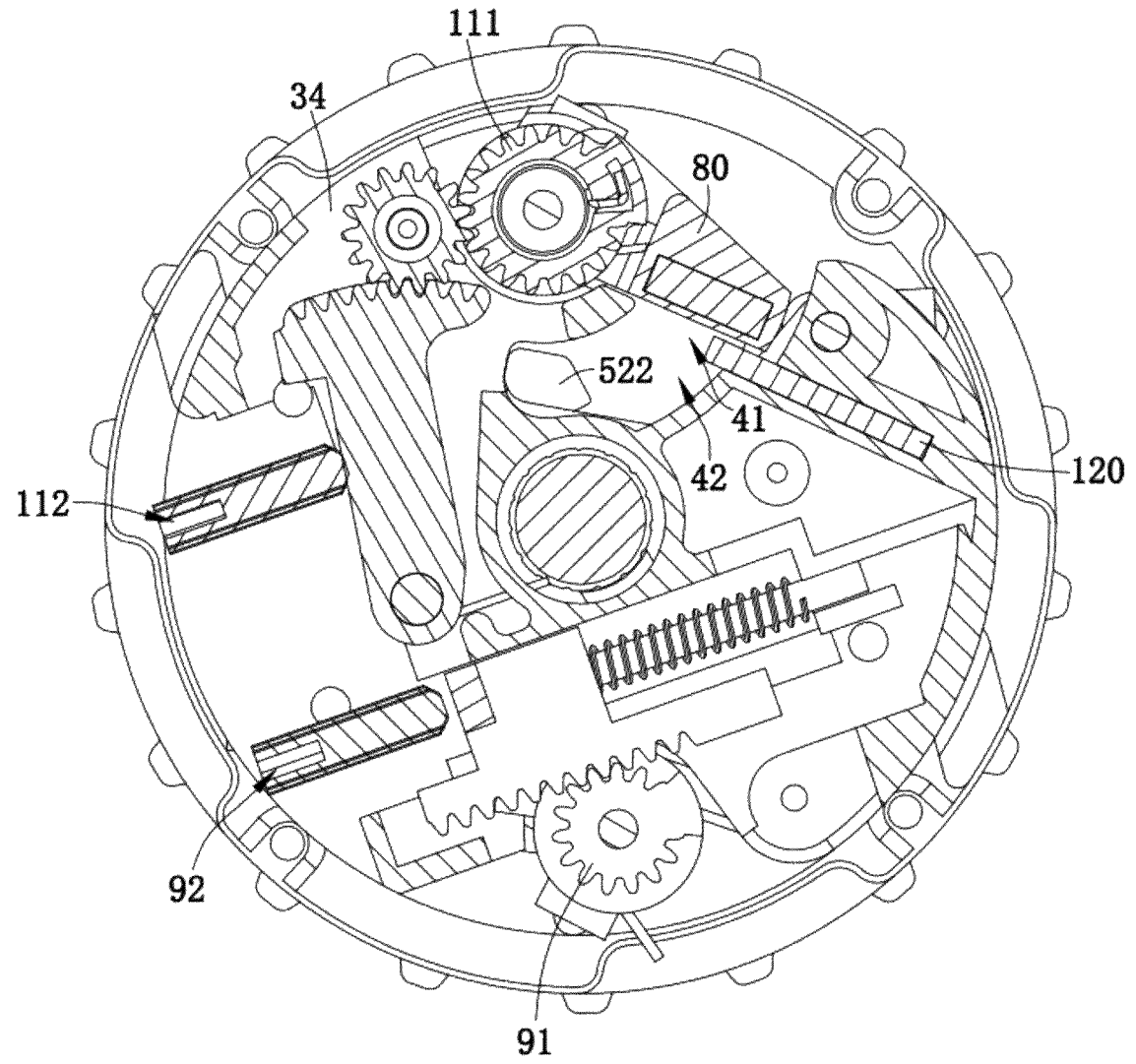
FIG. 18 is a schematic structural view showing positions of a part of components of the automatic internal transmission in FIG. 1 at a first gear.
Figure 19:
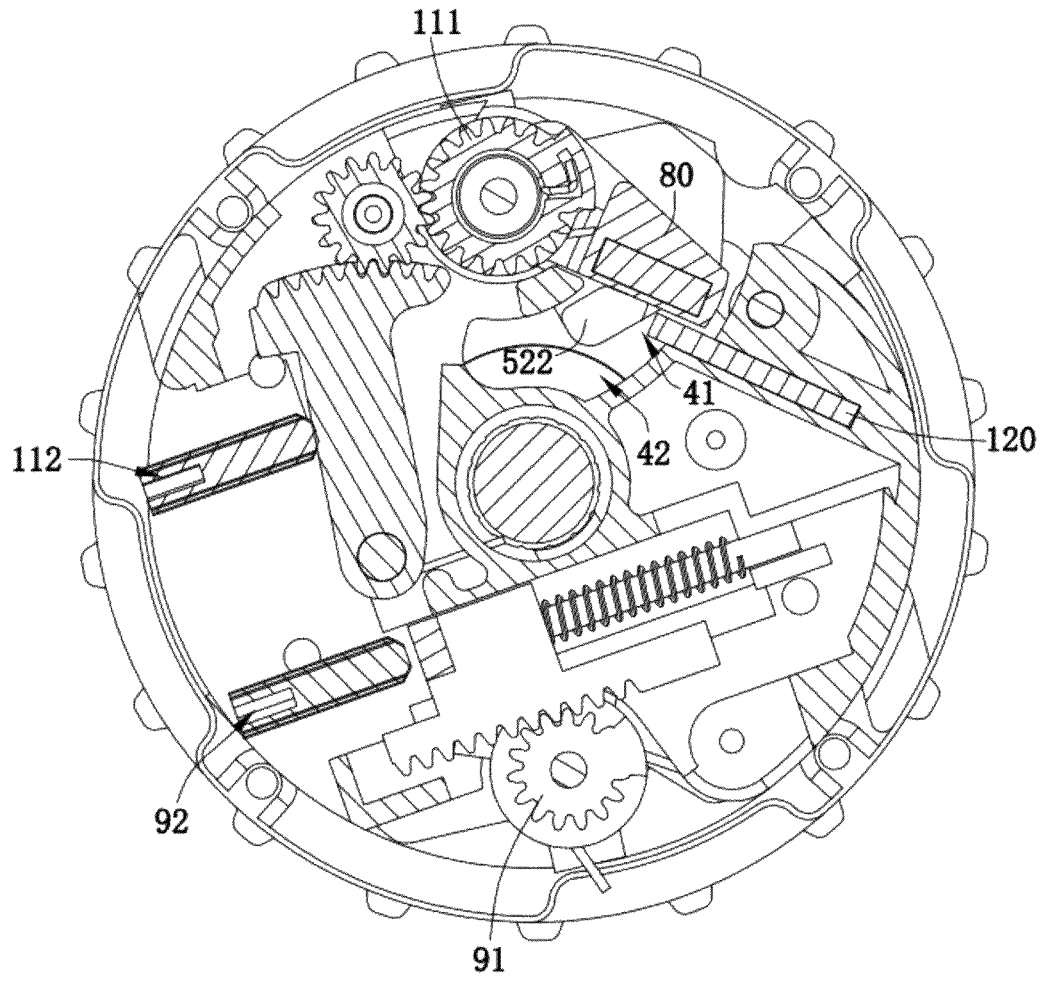
FIG. 19 is a schematic structural view showing positions of a part of components of the automatic internal transmission in FIG. 1 at a second gear.
Figure 20:
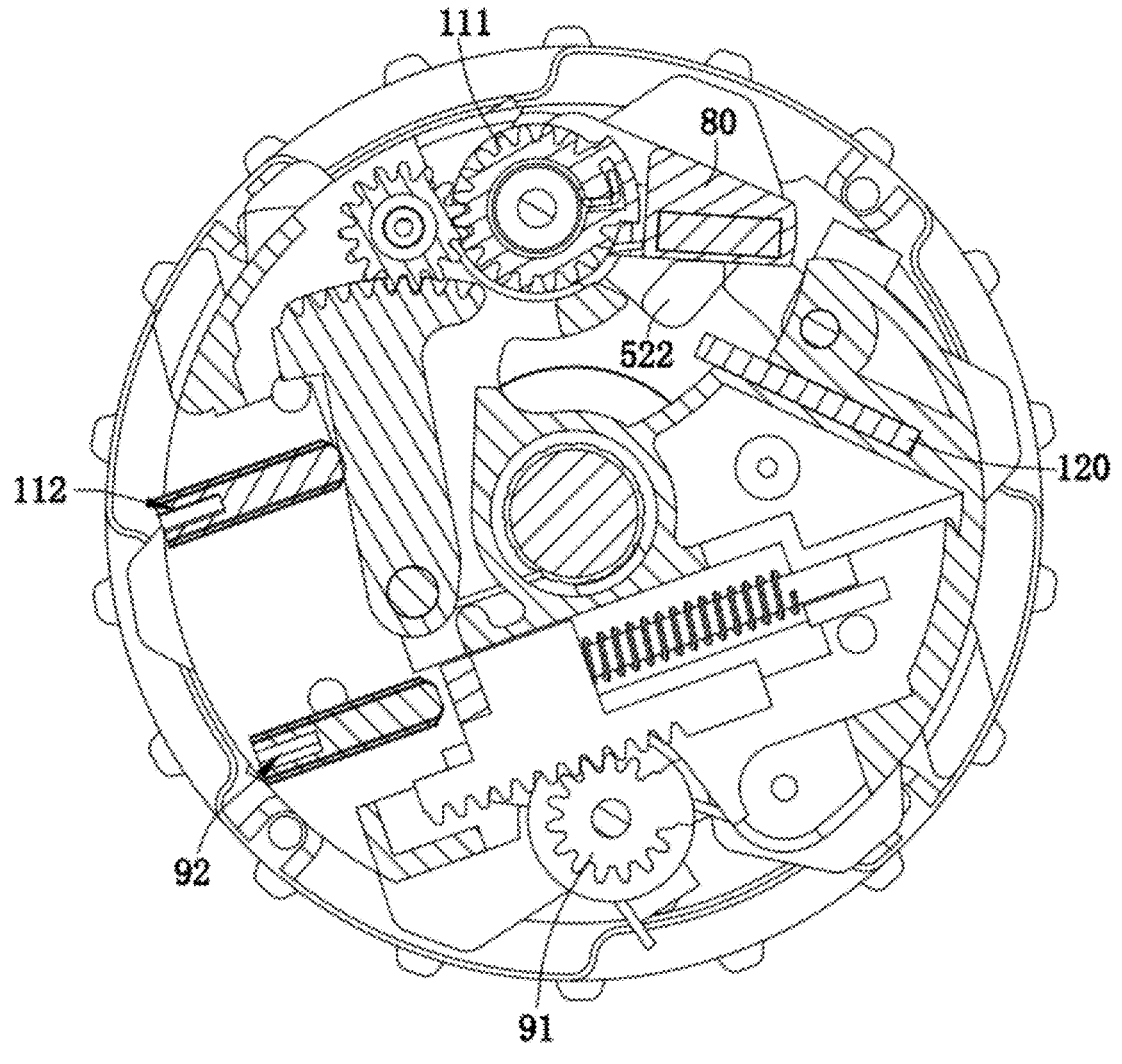
FIG. 20 is a schematic structural view showing positions of a part of components of the automatic internal transmission in FIG. 1 at a third gear.
Figure 21:
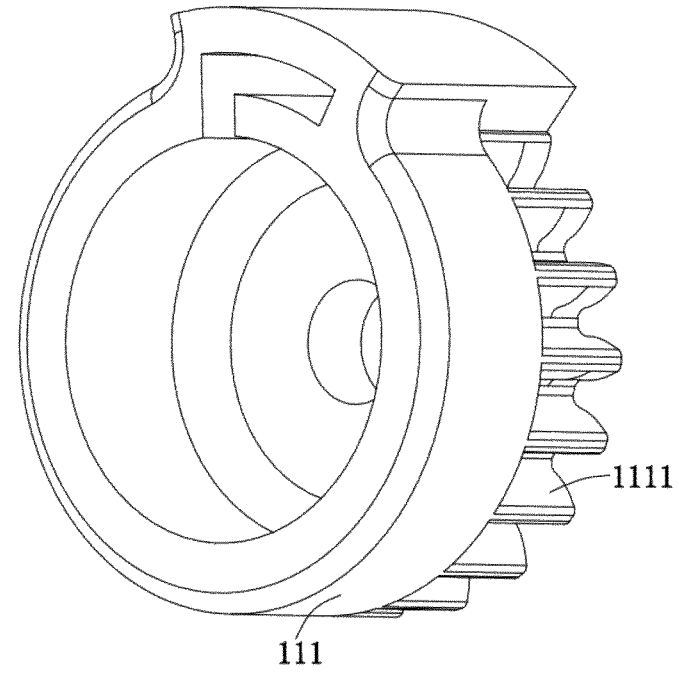
FIG. 21 is a schematic perspective view showing the structure of a second adjustment member in FIG. 16.
Figure 22:
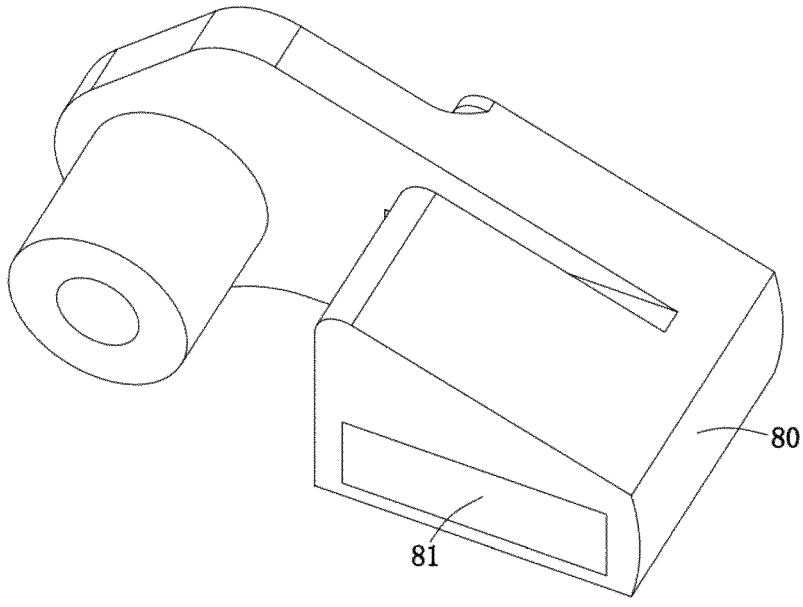
FIG. 22 is a schematic perspective view showing the structure of a damping member in FIG. 16.
Figure 23:
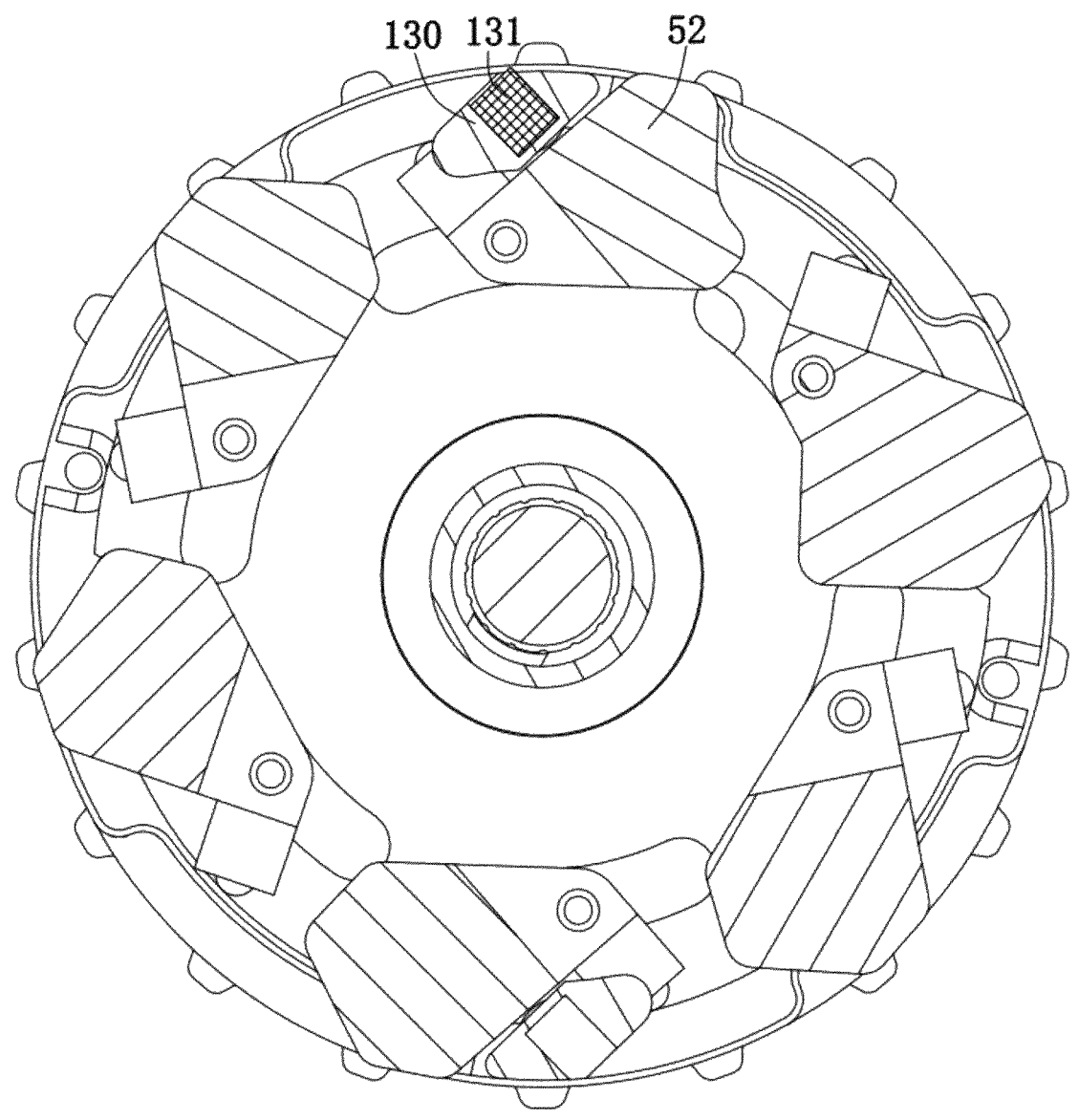
FIG. 23 is a schematic structural view showing positions of a part of components of the automatic internal transmission in FIG. 1 at the third gear.
Figure 24:
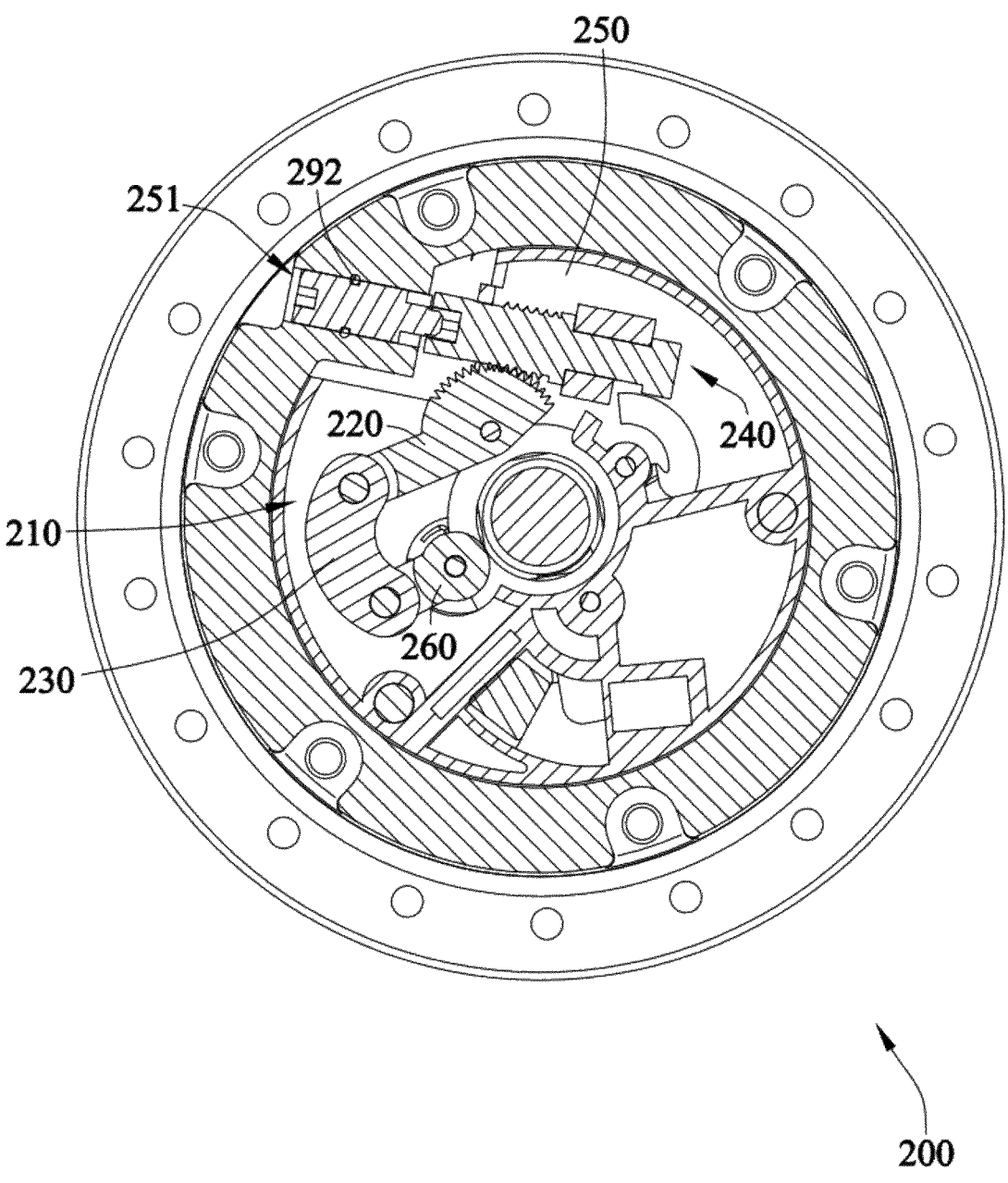
FIG. 24 is a schematic sectional view showing the structure of a part of components of an automatic internal transmission according to another embodiment.
Figure 25:
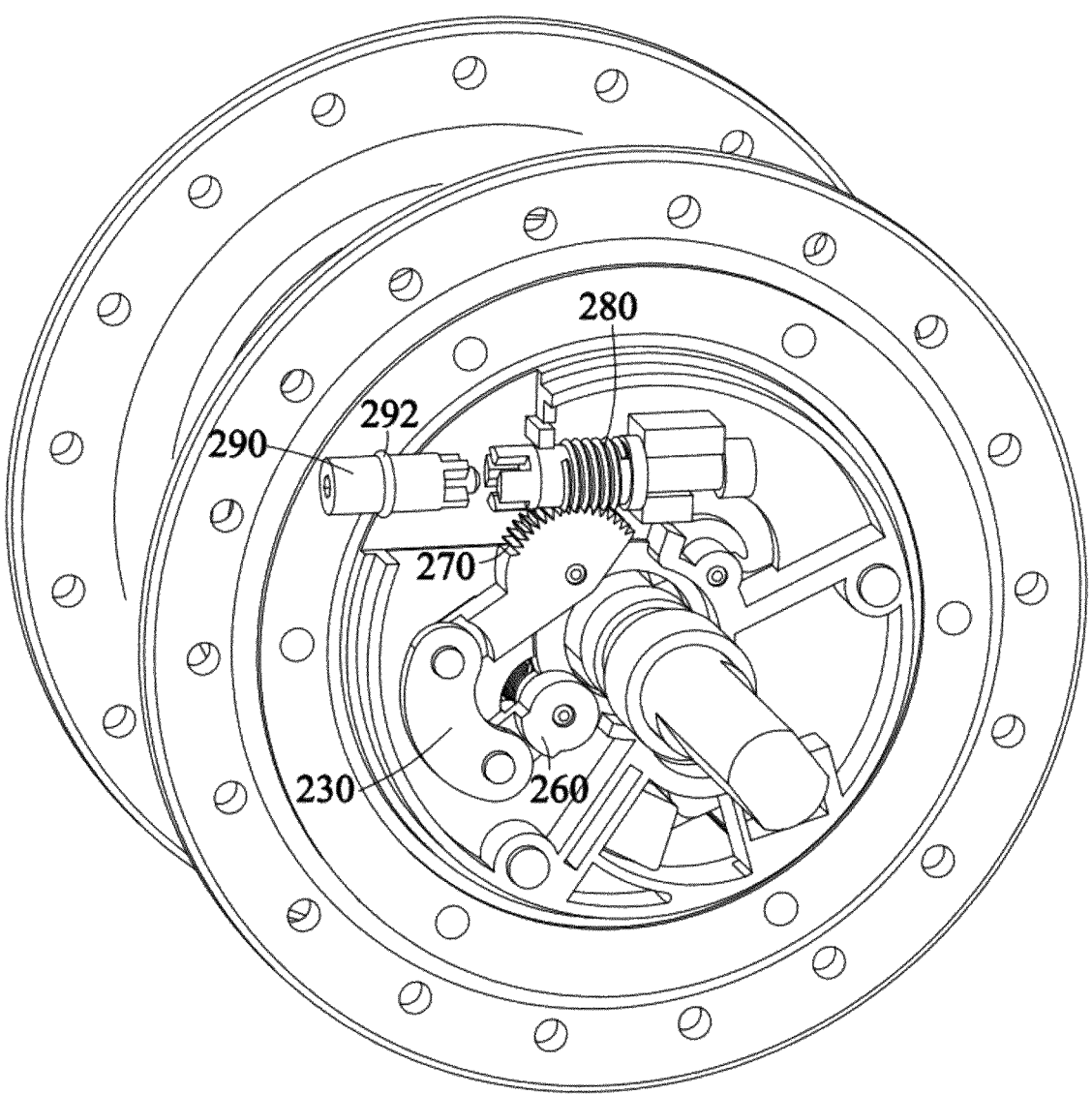
FIG. 25 is a schematic perspective view showing the structure of the part of components of the automatic internal transmission in FIG. 24.
Figure 26:
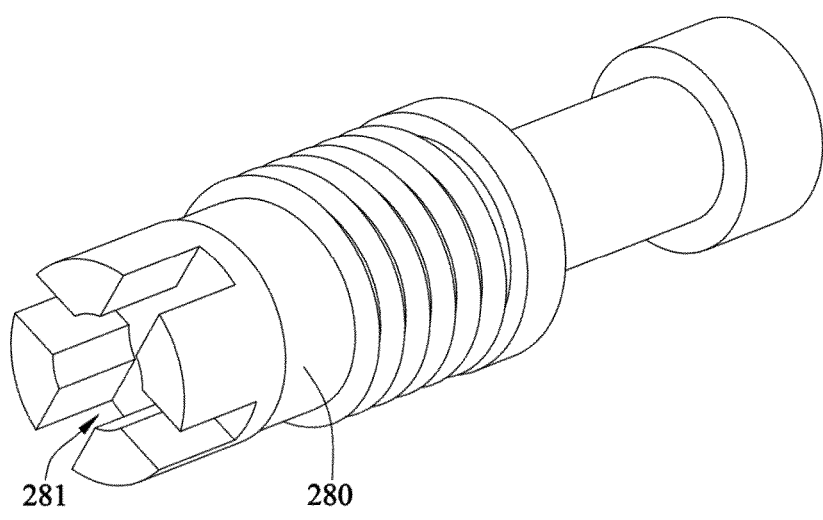
FIG. 26 is a schematic perspective view showing the structure of a worm in FIG. 24.
Figure 27:
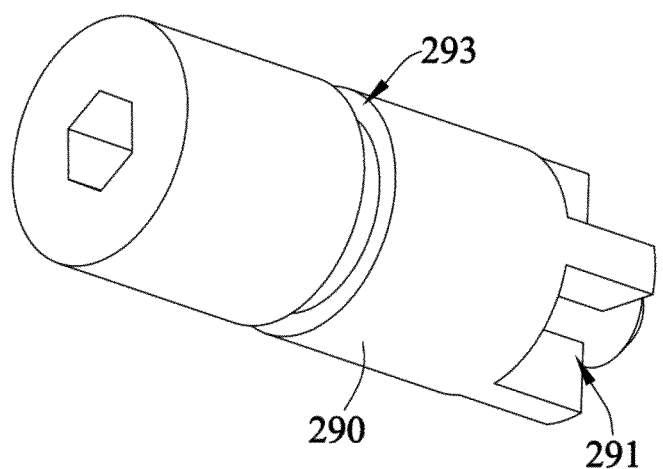
FIG. 27 is a schematic perspective view showing the structure of a driving rod in FIG. 24.

For those skilled in the art to better understand technical solutions of the present application, technical solutions according to the embodiments of the present application will be described clearly and completely as follows. It is obvious that the described embodiments are only a part of the embodiments according to the present application, rather than all of the embodiments. All the other embodiments obtained by those skilled in the art based on the embodiments in the present application without any creative work belong to the scope of protection of the present application.

It should be noted that, when a component is referred to as being "fixed to", "mounted to" or "arranged at" another component, it may be directly arranged at the another component or indirectly arranged at the another component; when a component and another component are "connected", or a component is referred to as being "connected to" another component, it may be directly connected to the another component or indirectly connected to the another component.

It should be noted that, the structures, proportions, sizes, etc. shown in the drawings of this specification are only used to coordinate with the content disclosed in the specification for the understanding and reading of people familiar with this technology, rather than intended to limit the conditions for the implementation of this application, therefore has no technical significance. Any structural modifications, changes in proportions, or adjustments in size, without affecting the effect and purpose of this application, should fall within the scope of the technical content disclosed in this application.

An automatic internal transmission is provided in the present application, including a hub shaft, an input mechanism, an output mechanism, a transmission mechanism and an automatic shift control mechanism, where the input mechanism and the output mechanism are both rotatably mounted to the hub shaft, and the input mechanism is configured to provide a driving force to drive the output mechanism to rotate; the transmission mechanism is mounted to the hub shaft, and is located between the input mechanism and the output mechanism; where the transmission mechanism at least includes a first planetary gear train and a second planetary gear train; the automatic shift control mechanism includes a centrifugal block and a clutch control unit, the centrifugal block is rotatably connected to the output mechanism, and the centrifugal block is connected to the clutch control unit; the centrifugal block is able to rotate with respect to the output mechanism along a first direction to a first state, so as to drive the clutch control unit to rotate, such that the driving force transmitted by the input mechanism is transmitted to the output mechanism via the first planetary gear train; and the centrifugal block is also able to further rotate with respect to the output mechanism along the first direction to a second state, so as to drive the clutch control unit to further rotate, such that the driving force transmitted by the input mechanism is transmitted to the output mechanism via the second planetary gear train. Thus, the "overshifting" situation will not arise during gear shifting of the automatic internal transmission, which better ensures the cycling experience of the rider.

Please refer to FIGS. 1 to 23 in conjunction. An automatic internal transmission 100 is provided in the present embodiment for automatic gear shifting according to the speed of the bicycle when moving forwards.

The automatic internal transmission 100 includes a hub shaft 10, an input mechanism 20, an output mechanism 30, a transmission mechanism 40 and an automatic shift control mechanism 50. The input mechanism 20 and the output mechanism 30 are both rotatably mounted to the hub shaft 10. That is, the input mechanism 20 is mounted to the hub shaft 10, and the input mechanism 20 is able to rotate with respect to the hub shaft 10; the output mechanism 30 is mounted to the hub shaft 10, and the output mechanism 30 is able to rotate with respect to the hub shaft 10. The hub shaft 10 is a central shaft of rotation of the input mechanism 20 and the output mechanism 30. The input mechanism 20 provides a driving force to drive the output mechanism 20 to rotate. Specifically, the input mechanism 20 may be a freewheel, the output mechanism 30 may be a hub, the input mechanism 20 is configured to be connected to a pedal of the bicycle via a chain, and the output mechanism 30 is configured to be connected to a driving wheel of the bicycle. When a rider is riding the bicycle, the input mechanism 20 is driven to rotate by pedaling, the driving force is input to the automatic internal transmission 100 by the input mechanism 20, and is output by the output mechanism 30 to drive the driving wheel of the bicycle to rotate, so that the bicycle moves forwards.

The transmission mechanism 40 is mounted to the hub shaft 10, and is located between the input mechanism 20 and the output mechanism 30, to transmit the driving force of the input mechanism 20 to the output mechanism 30. That is, the transmission mechanism 40 is arranged between the input mechanism 20 and the output mechanism 30, to transmit the driving force input by the input mechanism 20 to the output mechanism 30.

The transmission mechanism 40 at least includes a first planetary gear train 41 and a second planetary gear train 42. Specifically, in the present embodiment, the automatic internal transmission 100 is a three-gear automatic internal transmission. At a first gear, the driving force input by the input mechanism 20 is directly transmitted to the output mechanism 30 via a one-way clutch 21, i.e. the output mechanism 30 is directly driven by the input mechanism 20 to rotate. At a second gear, the driving force input by the input mechanism 20 is transmitted to the output mechanism 30 via the first planetary gear train 41. At a third gear, the driving force input by the input mechanism 20 is transmitted to the output mechanism 30 via the second planetary gear train 42. Certainly, in other embodiments, the automatic internal transmission 100 may have any number of gears. In the present embodiment, the three-gear automatic internal transmission 100 is merely taken as an example for illustration.

The automatic shift control mechanism 50 includes a centrifugal block 501 and a clutch control unit 53, the centrifugal block 501 is rotatably connected to the output mechanism 30, and the centrifugal block 501 is connected to the clutch control unit 53.

The centrifugal block 501 can rotate with respect to the output mechanism 30 along a first direction to a first state, so as to drive the clutch control unit 53 to rotate, such that the driving force transmitted by the input mechanism 20 is further transmitted to the output mechanism 30 via the first planetary gear train 41. That is, the centrifugal block 501 can rotate with respect to the output mechanism 30 when being subjected to a force, to drive the clutch control unit 53 to rotate, such that the clutch control unit 53 is directly or indirectly combined with the output mechanism 30 and the first planetary gear train 41, to transmit the driving force input by the input mechanism 20 to the output mechanism 30 via the first planetary gear train 41, so as to change a power transmission path in the automatic internal transmission 100, thereby realizing gear shifting of the automatic internal transmission 100.

The centrifugal block 501 is able to further rotate with respect to the output mechanism 30 along the first direction, to drive the clutch control unit 53 to further rotate, such that the driving force transmitted by the input mechanism 20 is transmitted to the output mechanism 30 via the second planetary gear train 42. That is, the centrifugal block 501 can further rotate with respect to the output mechanism 30 when being subjected to a force, to drive the clutch control unit 53 to further rotate, such that the clutch control unit 53 is directly or indirectly combined with the output mechanism 30 and the second planetary gear train 42, to transmit the driving force input by the input mechanism 20 to the output mechanism 30 via the second planetary gear train 42, so as to change the power transmission path in the automatic internal transmission 100, thereby realizing gear shifting of the automatic internal transmission 100. The first direction may be a clockwise direction or a counter-clockwise direction. It should be noted that, the first state and the second state refer to states after the centrifugal block 501 rotates, starting from an initial position, in the same direction by two different angles. That is, the first state is a state in which the centrifugal block 501 rotates from the initial position by an angle, and the second state is a state in which the centrifugal block 501 rotates from the initial position in the same direction by another angle. The another angle by which the centrifugal block is required to rotate to get to the second state is greater than the angle by which the centrifugal block is required to rotate to get to the first state, i.e. the centrifugal block must rotate to the first state before it rotates to the second state.

Specifically, in the present embodiment, the centrifugal block 501 is used to control shifting between the first gear and the second gear and shifting between the second gear and the third gear. More specifically, when the centrifugal block 501 is partially "thrown out" (where "thrown out"

refers to that the centrifugal block rotates, when being subjected to a centrifugal force, with respect to the output mechanism 30 towards a direction away from the hub shaft 10), the centrifugal block 501 is in the first state, and the automatic internal transmission 100 is shifted to the second gear. When the centrifugal block 501 is completely "thrown out", the centrifugal block 501 is in the second state, and the automatic internal transmission 100 is shifted to the third gear. That is, the centrifugal block 501 is "thrown out" to different extents, to control shifting among different gears. Certainly, in other embodiments, more gears can be controlled by different extents to which the centrifugal block 501 of the same type is "thrown out". For example, when the centrifugal block 501 is partially "thrown out", a second gear is reached; when the centrifugal block 501 is further "thrown out", a third gear is reached; and when the centrifugal block 501 is yet further "thrown out", a fourth gear is reached. The specific number of the gears controlled by the centrifugal block 501 can be selected according to actual needs. The present embodiment only describes the shifting between the first gear and the second gear and the shifting between the second gear and the third gear controlled by the centrifugal block 501 as examples.

When the bicycle is moving forwards, the centrifugal block 501 will be "thrown out" outwards due to the action of the centrifugal force when the rotation speed of the output mechanism 30 reaches a certain speed. Since the clutch control unit 53 is connected to the centrifugal block 501, when the centrifugal block 501 is "thrown out" outwards, the clutch control unit 53 is driven to rotate, which changes the rotation state of the clutch control unit 53, making components of the clutch control unit 53 directly or indirectly combined with the output mechanism 30, so as to change the power transmission path in the automatic internal transmission 100, thereby achieving the gear shifting of the automatic internal transmission 100. It should be noted that, a combining component of the clutch control unit 53 may be arranged between the transmission mechanism 40 and the output mechanism 30, such that when the clutch control unit 501 drives the clutch control unit 53 to rotate by a certain angle, the combining component of the clutch control unit 53 can make a component of the transmission mechanism 40 be combined with a corresponding component of the output mechanism 30, thereby achieving gear shifting. Alternatively, the combining component of the clutch control unit 53 may be arranged in the transmission mechanism 40, such that when the clutch control unit 501 drives the clutch control unit 53 to rotate by a certain angle, the combining component of the clutch control unit 53 can make two (or more) components of the transmission mechanism 40 be combined with each other, thereby achieving gear shifting. That is to say, the clutch control unit 53 may be arranged between the transmission mechanism 40 and the output mechanism 30, to control combination between the transmission mechanism 40 and the output mechanism 30; or, the clutch control unit 53 may be arranged in the transmission mechanism 40, to control combination between the components of the transmission mechanism 40.

It may be appreciated that, in the conventional automatic internal transmission, centrifugal blocks and clutch control units for controlling different gears are independent from one another. During specific adjustment process, different centrifugal blocks are thrown out when being subjected to the centrifugal force, to control different clutch control units to rotate, thereby achieving shifting among multiple gears. For example, in a case that the automatic internal transmission has three gears, the automatic internal transmission usually includes a second gear centrifugal block, a third gear centrifugal block, a first clutch control unit and a second clutch control unit, where the second gear centrifugal block is connected to the first clutch control unit, and the third gear centrifugal block is connected to the second clutch control unit. When the bicycle is in a first gear state, both the second gear centrifugal block and the third gear centrifugal block do not work. When the speed of the bicycle increases to a certain extent, the second gear centrifugal block is "thrown out" outwards due to the action of the centrifugal force, so as to drive the first clutch control unit to rotate, such that a clutch controller of the first clutch control unit is combined with a second gear planetary gear train of the transmission mechanism. At this time, the bicycle is in a second gear state. When the speed of the bicycle further increases, the third gear centrifugal block is "thrown out" outwards due to the action of the centrifugal force, so as to drive the second clutch control unit to rotate, such that a clutch controller of the second clutch control unit is combined with a third gear planetary gear train of the transmission mechanism. At this time, the bicycle is in a third gear state. In use, the "overshifting" situation is likely to arise. For example, before the second gear centrifugal block being "thrown out" to drive the first clutch control unit to rotate to achieve shifting to the second gear state, the third gear centrifugal block has already been "thrown out" and drives the second clutch control unit to rotate into the third gear state, which results in that the bicycle directly skips from the first gear to the third gear without shifted into the second gear, and the "overshifting" situation arises, which affects the cycling experience of the rider.

In the present embodiment, the centrifugal block 501 is connected to the clutch control unit 53. The centrifugal block 501 drives the clutch control unit 53 to rotate in the same direction by different angles to achieve shifting of different gears, such that during shifting from a low speed gear to a high speed gear, an intermediate speed gear is necessarily shifted to. Therefore, the "overshifting" situation can be effectively prevented, which better ensures the cycling experience of the rider.

Specifically, in the present embodiment, the automatic internal transmission 100 is provided with six centrifugal blocks 501, and all the six centrifugal blocks 501 are connected to the same clutch control unit 53, such that the six centrifugal blocks can work synchronously with the clutch control unit 53. For easier illustration, one of the six centrifugal blocks 501 is referred to as a first centrifugal block 51, and another one of the six centrifugal blocks 501 is referred to as a second centrifugal block 52. Certainly, in other embodiments, more or less centrifugal blocks may be provided in the automatic internal transmission 100. In the present embodiment, the clutch control unit 53 can be controlled more stably by the six centrifugal blocks, which better ensure the stability of shifting.

Preferably, the clutch control unit 53 includes a synchronization ring 531, a control sleeve 532 and a clutch controller 533. The centrifugal blocks 501 are connected to the synchronization ring 531, the control sleeve 532 is connected to the synchronization ring 531, and the clutch controller 533 is located between the transmission mechanism 40 and the output mechanism 30. The centrifugal blocks 501 drive the synchronization ring 531 to rotate, thereby driving the control sleeve 532 to rotate to control the clutch controller 533. In the first state, the control sleeve 532 controls the clutch controller 533 to combine the first planetary gear train 41 with the output mechanism 30. In the second state, the control sleeve 532 controls the clutch controller 533 to combine the second planetary gear train 42 with the output mechanism 30. That is, in the present embodiment, the clutch control unit 53 is arranged between the transmission mechanism 40 and the output mechanism 30 to control combination between the transmission mechanism 40 and the output mechanism 30. The centrifugal blocks 501 can drive the synchronization ring 531 to rotate, the synchronization ring 531 in turn drives the control sleeve 532 to rotate, and the control sleeve 532 controls the clutch controller 533, such that the first planetary gear train 41 is combined with the output mechanism 30 by the clutch controller 533, thereby achieving the second gear shifting. Moreover, the centrifugal blocks 501 can drive the synchronization ring 532 to further rotate, the synchronization ring 531 drives the control sleeve 532 to further rotate, and the control sleeve 532 controls the clutch controller 533, such that the second planetary gear train 42 is combined with the output mechanism 30 by the clutch controller 533, thereby achieving the third gear shifting.

Specifically, in the present embodiment, the six centrifugal blocks 501 are distributed on the synchronization ring 531 in an annular array.

Preferably, the clutch controller 533 includes a hub bush 5331, a first pawl 5332 and a second pawl 5333. The hub bush 5331 is connected to the output mechanism 30, and the first pawl 5332 and the second pawl 5333 are each rotatably connected to the hub bush 5331. In the first state, the control sleeve 532 controls the first pawl 5332, to combine the first pawl 5332 with the first planetary gear train 41. In the second state, the control sleeve 532 controls the second pawl 5333, to combine the second pawl 5333 with the second planetary gear train 42. That is, in the present embodiment, the clutch controller 533 is mounted to the output mechanism 30, and the clutch controller 533 is a pawl type controller. When the rotation speed of the output mechanism 30 reaches a certain extent, the control sleeve 532 controls corresponding pawls to achieve combination between the transmission mechanism 40 and the output mechanism 30. Certainly, in other embodiments, the clutch controller 533 may be clutch controllers of other forms, such as a pawl-type, roller-type, wedge-type, or pawl and roller combined type clutch controller or the like.

Preferably, the first pawl 5332 and the second pawl 5333 are arranged spaced apart from each other along an axial direction. The control sleeve 532 is provided with a first control groove 5321 and a second control groove 5322. The first control groove 5321 runs through the control sleeve 532 in a radial direction, and the first control groove 5321 is arranged in correspondence to the first pawl 5332 in the axial direction. The second control groove 5322 runs through the control sleeve 532 in the radial direction, and the second control groove 5322 is arranged in correspondence to the second pawl 5333 in the axial direction. In the first state, an inner wall of the first control groove 5321 abuts against the first pawl 5332 to press the first pawl 5332 downwards, such that the first pawl 5332 passes through the first control groove 5321 to be combined with the first planetary gear train 41. In the second state, an inner wall of the second control groove 5322 abuts against the second pawl 5333 to press the second pawl 5333 downwards, such that the second pawl 5333 passes through the second control groove 5322 to be combined with the second planetary gear train 42. In this way, interference between components can be better prevented, which better ensures control stability, makes the structure more compact and reduces the occupied space. When the centrifugal blocks 501 are partially "thrown out" to be in the first state, the control sleeve 532 is driven to rotate, such that the groove wall of the first control groove 5321 correspondingly abuts against and presses the first control pawl 5332 downwards, such that the first control pawl 5332 is able to combine the first planetary gear train 41 with the output mechanism 30, thereby achieving the shifting of transmission. When the centrifugal blocks 501 are completely "thrown out" to be in the second state, the control sleeve 532 is driven to further rotate, such that the groove wall of the second control groove 5322 correspondingly abuts against and presses the second control pawl 5333 downwards, such that the second control pawl 5333 is able to combine the second planetary gear train 43 with the output mechanism 30, thereby achieving the shifting of transmission.

It should be noted that, in the present embodiment, the axial direction and the radial direction are referred to as an axial direction and a radial direction of the hub shaft 10 respectively.

Specifically, in the present embodiment, pawl mounting grooves 5334 are provided in an inner surface of the hub bush 5331, and the first pawl 5332 and the second pawl 5333 are each mounted to the corresponding pawl mounting groove 5334. A hub connection groove 5335 is provided in an outer surface of the hub bush 5331, and the hub bush 5331 is fixedly connected to the output mechanism 30 via the hub connection groove 5335. The first pawl 5332 includes a rotation portion 5336, a working portion 5337 and a control portion 5338. The rotation portion 5336 is correspondingly mounted in the pawl mounting groove 5334, and the working portion 5337 extends along the axial direction to form the control portion 5338. The control sleeve 532 is configured to abut against the control portion 5338 to press the first pawl 5332 downwards, such that the working portion 5337 is combined with the first planetary gear train 41. A combining groove 4111 is provided in an outer surface of a ring gear 411 of the first planetary gear train 41. When the control sleeve 532 presses the first pawl 5332 downwards, the working portion 5337 is correspondingly inserted into the combining groove 4111, which makes them combined. The structure of the second pawl 5333 is substantially similar to the structure of the first pawl 5332, which will not be described herein. Moreover, the structure of the second planetary gear train 42 for combining with the second pawl 5333 is similar to the corresponding structure of the first planetary gear train 41, which will not be described herein.

Preferably, the synchronization ring 531 includes a synchronization ring body 5311, a centrifugal block connection protrusion 5312 and a control sleeve connection protrusion 5313. The centrifugal block connection protrusion 5312 is arranged at one end of the synchronization ring body 5311 in the axial direction, and the centrifugal block 501 is connected to the centrifugal block connection protrusion 5312. The control sleeve connection protrusion 5313 is arranged at the other end of the synchronization ring body 5311 in the axial direction, and the control sleeve 532 is connected to the control sleeve connection protrusion 5313. In this way, the stability of connection among the synchronization ring 531 with the centrifugal block 501 and the control sleeve 532 can be better ensured. It should be noted that, the connection between the synchronization ring 531 and the control sleeve 532 may be rigid or flexible. The rigid connection refers to that, the synchronization ring 531 and the control sleeve 532 are directly connected, and the synchronization ring 531 can drive the control sleeve 532 to rotate synchronously. The flexible connection refers to that, the synchronization ring 531 and the control sleeve 532 are connected via a buffer accumulator (e.g. a torsion spring), and the synchronization ring 531 can drive the control sleeve 532 to rotate with a relative delay.

Preferably, the automatic internal transmission 100 further includes a first resilient reset member 60. The first resilient reset member 60 is connected to the output mechanism 30, and provides a first restoring force to the centrifugal block 501 by its own resilience, to make the centrifugal block 501 be restored along a second direction and kept in the initial state, where the second direction and the first direction are two opposite directions. The initial state refers to a state in which the centrifugal block 501 is not subjected to the centrifugal force, which in this embodiment specifically refers to the state in which the automatic internal transmission 100 is at the first gear.

Preferably, the automatic internal transmission 100 further includes a second resilient reset member 70 and a damping member 80. The damping member 80 and the output mechanism 30 are connected to two ends of the second resilient reset member 70 respectively. The damping member 80 is configured to stop the centrifugal block 501, and the damping member 80 is configured to provide a second restoring force to the centrifugal block 501 through the resilience of the second resilient reset member 70, to make the centrifugal block 501 be restored and kept in the first state.

Both the first resilient reset member 60 and the second resilient reset member 70 refer to a component which is elastically deformed when being subjected to a force, and can be restored to an initial state when the force is reduced or removed.

The expression "to make the centrifugal block 501 be restored and kept in the initial state" refers to that, making the centrifugal block 501 tend to rotate towards the initial state, such that when the centrifugal force applied to the centrifugal block 501 is reduced or removed, the centrifugal block 501 can be driven by the first restoring force to rotate towards the initial position, and can be kept in the state by the first restoring force after rotation is completed. That is, the first resilient reset member 60 provides a force opposite to the tendency of the centrifugal force to the centrifugal block 501, such that the first resilient reset member 60 is able to drive the centrifugal block 501 to completely get reset, and the gear is restored. Therefore, when the centrifugal block 501 is subjected to the centrifugal force, the centrifugal force has to overcome the first restoring force applied to the centrifugal block 501 by the first resilient reset member 60, so that the centrifugal block 501 can be "thrown out" outwards, and can drive the clutch control unit 53 to rotate to be in position, to achieve gear shifting. It should be noted that, the first restoring force can be directly or indirectly applied to the centrifugal block 501 by the first resilient reset member 60. For example, the first resilient reset member 60 is directly connected to the first centrifugal block 51, such that the first resilient reset member 53 directly acts on the first centrifugal block 51; or, the first resilient reset member 60 is connected to the clutch control unit 53, such that the first resilient reset member 53 directly acts on the clutch control unit 53, and indirectly provides the first restoring force to the centrifugal block 501 via the clutch control unit 53; or, the first resilient reset member 60 may be connected to another intermediate component, and applies force to the centrifugal block 501 via the another intermediate component, as long as the first restoring force provided by the first resilient reset member 60 by its own resilience can be applied to the centrifugal block 501. Furthermore, the first restoring force may drive the centrifugal block 501 to be completely restored to the initial position, or the first restoring force may drive the centrifugal block 501 to be partially restored to the initial position. That is, as long as the first restoring force drives the centrifugal block 501 to rotate along a reverse direction, to drive the clutch control unit 53 to rotate, so as to achieve the shifting of gears.

The expression "to make the centrifugal block 501 be restored and kept in the first state" refers to that, making the centrifugal block 501 tend to rotate towards the initial position, such that when the centrifugal force applied to the centrifugal block 501 is reduced, the second centrifugal block 501 can be driven by the second restoring force to rotate towards the initial position, and can be kept in the state after rotation is completed. That is, the second resilient reset member 70 is configured to provide a force opposite to the tendency of the centrifugal force to the centrifugal block 501 via the damping member 80, such that the damping member 80 is able to drive the centrifugal block 501 to get partially reset, to make the gear be restored and kept in the second gear state. Therefore, when the centrifugal block 501 is subjected to the centrifugal force, the centrifugal force has to overcome the second restoring force applied to the centrifugal block 501 by the damping member 80, so that the centrifugal block 501 can be completely "thrown out" outwards, to drive the clutch control unit 53 to rotate to be in position, to achieve gear shifting. It should be noted that, in other embodiments, the second restoring force may drive the centrifugal block to be completely restored to the initial position.

The first resilient reset member 60 and the second resilient reset member 70 can drive the automatic internal transmission 100 to be automatically reset, and shift to the low speed gear when the speed of the bicycle decreases, which further ensures the cycling experience.

Specifically, in the present embodiment, the first resilient reset member 60 is configured to act on the first centrifugal block 51, and the second resilient reset member 70 is configured to act on the second centrifugal block 52. Certainly, in other embodiments, the first resilient reset member 60 and the second resilient reset member 70 may both act on the same centrifugal block 501. In the present embodiment, the first resilient reset member 60 and the second resilient reset member 70 act on different centrifugal blocks 501, which facilitates the mounting of the components and prevents the interference between the components.

Preferably, the automatic internal transmission 100 further includes a first resilient force adjustment structure 90, and the first resilient reset member 60 is connected to the output mechanism 30 via the first resilient force adjustment structure 90.

The first resilient force adjustment structure 90 includes a first adjustment member 91 and a first driving member 92. The first adjustment member 91 is connected to the first resilient reset member 60, the first driving member 92 is connected to the output mechanism 30, and the first driving member 92 is connected to the first adjustment member 91. The first driving member 92 is able to drive the first adjustment member 91 to work, to change the deformed state of the first resilient reset member 60, so as to change the first restoring force applied to the first centrifugal block 51. That is, the first driving member 92 is mounted to the output mechanism 30, and the first driving member 92 is configured to provide a driving force to the first adjustment member 91, such that the first adjustment member 91 works. The expression "the first adjustment member 91 works" refers to that, the first adjustment member 91 moves or rotates with respect to the first resilient reset member 60, such that the first adjustment member 91 applies a force to the first resilient reset member 60, making the first resilient reset member 60 be deformed, to change the deformed state of the first resilient reset member 60. Therefore, the first restoring force applied to the first centrifugal block 51 by the first resilient reset member 60 is changed, such that the first centrifugal block 51 can be partially "thrown out" outwards under a smaller centrifugal force (or the first centrifugal block 51 requires a larger centrifugal force in order to be partially "thrown out" outwards). That is to say, in the present embodiment, the first adjustment member 91 can move with respect to the first resilient reset member 60, to change the deformed state of the first resilient reset member 60, and further change the first restoring force applied to the first centrifugal block 51 by the first resilient reset member 60, such that the centrifugal blocks 501 in the automatic internal transmission 100 can be "thrown out" at different rotation speeds according to actual needs, which satisfies cycling requirements of different riders. The first driving member 92 provides the driving force to the first adjustment member 91, to drive the first adjustment member 91 to work. The first driving member 92 may provide the driving force to the first adjustment member 91 in a manual manner, or the first driving member 92 may provide the driving force to the first adjustment member 91 in an automatic manner, as long as the first driving member 92 can drives the first adjustment member 91 to work.

Preferably, the automatic internal transmission 100 further includes a second resilient force adjustment structure 110, and the second resilient reset member 70 is connected to the output mechanism 30 via the second resilient force adjustment structure 110.

The second resilient force adjustment structure 110 includes a second adjustment member 111 and a second driving member 112. The second adjustment member 111 is connected to the second resilient reset member 70, the second driving member 112 is connected to the output mechanism 30, and the second driving member 112 is connected to the second adjustment member 111. The second driving member 112 is able to drive the second adjustment member 111 to work, to change the deformed state of the second resilient reset member 70, so as to change the second restoring force applied to the second centrifugal block 52 by the damping member 80. That is, the second driving member 112 is mounted to the output mechanism 30, and the second driving member 112 is configured to provide a driving force to the second adjustment member 111, such that the second adjustment member 111 works. The expression "the second adjustment member 111 works" refers to that, the second adjustment member 111 moves or rotates with respect to the second resilient reset member 70, such that the second adjustment member 111 applies a force to the second resilient reset member 70, making the second resilient reset member 70 be deformed, to change the deformed state of the second resilient reset member 70. Therefore, the second restoring force applied to the second centrifugal block 52 by the damping member 80 is changed, such that the second centrifugal block 52 can be completely "thrown out" outwards under a smaller centrifugal force (or the second centrifugal block 52 requires a larger centrifugal force in order to be completely "thrown out" outwards). That is to say, in the present embodiment, the second adjustment member 111 can move with respect to the second resilient reset member 70, to change the deformed state of the second resilient reset member 70, and further change the second restoring force applied to the second centrifugal block 52 by the second resilient reset member 70 via the damping member 80, such that the centrifugal blocks 501 in the automatic internal transmission 100 can be completely "thrown out" at different rotation speeds according to actual needs, which satisfies cycling requirements of different riders. The second driving member 112 is configured to provide the driving force to the second adjustment member 111, to drive the second adjustment member 111 to work. The second driving member 112 may provide the driving force to the second adjustment member 111 in a manual manner, or the second driving member 112 may provide the driving force to the second adjustment member 111 in an automatic manner, as long as the second adjustment member 111 can be driven to work by the second driving member 112

In the present embodiment, the second restoring force drives the second centrifugal block 52 to partially move back to the initial position. Specifically, when the rotation speed of the output mechanism 30 increases, the centrifugal force applied to the first centrifugal block 51 can overcome the first restoring force, to make the six centrifugal blocks 501 be partially "thrown out", making the clutch control unit 53 rotate, to realize shifting from the first gear to the second gear. In the second gear state, the second centrifugal block 52 exactly gets in contact with the damping member 80, and the second centrifugal block 52 is stopped by the damping member 80. When the rotation speed of the output mechanism 30 further increases, the centrifugal force applied to the second centrifugal block 52 can overcome the second restoring force, to make six centrifugal blocks 501 be completely "thrown out", making the clutch control unit 53 further rotate, to realize shifting from the second gear to the third gear. The second centrifugal block 52 is stopped by the damping member 80, which better prevents the overshifting situation when the bicycle moves forwards, thereby better improving the cycling experience of the rider. That is to say, in the present embodiment, the second restoring force is used to drive the second centrifugal block 52 to shift from the second state, in which the second centrifugal block 52 is completely "thrown out", to the first state, in which the second centrifugal block 52 is partially "thrown out", i.e. the automatic internal transmission 100 is shifted from the third gear to the second gear. The damping member 80 makes the automatic internal transmission 100 be better kept at the second gear state, which better ensures the stability of the state.

It may be appreciated that, the resilient reset member of an automatic internal transmission in the prior art is directly connected to the hub, and the restoring force applied to the centrifugal block by the resilient reset member is constant, such that every time the centrifugal block is "thrown out" for gear shifting and speed changing of the automatic internal transmission is achieved at the same speed. However, different riders have different requirements for gear shifting and speed changing. For example, some riders require the centrifugal block to be "thrown out" at a relatively low speed state to achieve gear shifting and speed changing, while other riders require the centrifugal block to be "thrown out" at a relatively high speed state to achieve gear shifting and speed changing. The automatic internal transmission in the prior art cannot satisfy the above requirements of riders, and is circumscribed.

In the automatic internal transmission 100 provided in the present embodiment, the first adjustment member 91 is connected to the first resilient reset member 60, and the first driving member 92 can drive the first adjustment member 91 to work. Therefore, the rider can apply a driving force to the first adjustment member 91 via the first driving member 92 according to actual needs, to "compress" or "release" the first resilient reset member 60, so as to change the first restoring force applied to the first centrifugal block 51 by the first resilient reset member 60, such that during bicycle riding, the first centrifugal block 51 can be "thrown out" at a relatively low speed state, or the first centrifugal block 51 can only be "thrown out" at a relatively high speed state. Meanwhile, the resilience of the second resilient reset member 70 can be adjusted via the second resilient force adjustment structure 110. The automatic internal transmission 100 can better satisfy different cycling requirements of riders.

Preferably, the first adjustment member 91 is rotatably connected to the output mechanism 30, and the first resilient reset member 60 is a torsion spring. The first driving member 92 can drive the first adjustment member 91 to rotate, to twist the first resilient reset member 60. Preferably, two ends of the first resilient reset member 60 are connected to the first adjustment member 91 and the centrifugal block 51 respectively. That is, in the present embodiment, the first resilient reset member 60 is directly connect to the first centrifugal block 51, and the first restoring force is applied to the first centrifugal block 51 through the torsional force of the first resilient reset member 60. Furthermore, the first adjustment member 91 is connected to the output mechanism 30, and the first adjustment member 91 can rotate with respect to the output mechanism 30, to twist the first resilient reset member 60, so as to change the torsional force of the first resilient reset member 60. Certainly, in other embodiments, the first resilient reset member 60 may be other resilient components, such as a tension spring, a compression spring or the like. Alternatively, the first adjustment member 91 may be slidably arranged on the output mechanism 30, to drive the first adjustment member 91 to move, so as to change the deformed state of the first resilient reset member 60. Besides, the first resilient reset member 60 may be indirectly connected to the first centrifugal block 51, and the acting force is applied to the first centrifugal block 51 via another intermediate component. In the present embodiment, the first resilient reset member 60 is the torsion spring, and the first adjustment member 91 is rotatably connected to the output mechanism 30, such that the overall structure is simpler, and the space occupied is smaller, which facilitates arrangement and improves the stability of the control process. The first resilient reset member 60 is directly connected to the first centrifugal block 51, making it easier to apply the acting force to the first centrifugal block 51.

Preferably, the first adjustment member 91 is provided with a first gear 911, and the first driving member 92 is engaged with the first gear 911. That is to say, both the first adjustment member 91 and the first driving member 92 are provided with teeth, and the first driving member 91 is engaged with the first gear 911, which better ensures the first driving member 92 to drive the first adjustment member 91, and better ensures the first driving member 92 to drive the first adjustment member 91 to rotate, thereby ensuring the stability of the control process. Meanwhile, accidental slide between the first driving member 92 and the first adjustment member 91 is prevented, which better ensures that the position state of the first adjustment member 91 can be kept after being adjusted in position.

Preferably, the first driving member 92 includes a first driving bolt 921 and a driving rack 922. The output mechanism 30 is provided with a first threaded hole 31, and the first driving bolt 921 is correspondingly mounted at the first threaded hole 31. The driving rack 922 is engaged with the first gear 911, and the first driving bolt 921 is able to drive the driving rack 922 to move, thereby driving the first adjustment member 91 to rotate. That is, the first driving bolt 921 is mounted in the first threaded hole 31, such that the first driving bolt 921 can move when being screwed, to further drive the driving rack 922 to move, making the first adjustment member 91 rotate. In the first driving member 92 provided in the present embodiment, the first driving bolt 921 is in fit with the first threaded hole 31, and the driving rack 922 drives the first adjustment member 91, to make the first driving member 92 be self-locked. After adjustment, threaded connection between the first driving bolt 921 and the first threaded hole 31 can prevent the first driving member 92 from moving back, which better ensures the reliability and effectiveness of the adjustment. That is to say, in the present embodiment, the first driving member 92 is of a manually driving structure, such that the rider can adjust the automatic internal transmission 100 simply by manually screwing the first driving bolt 921. The structure is simple and reliable, and the cost is effectively reduced. Certainly, in other embodiments, the specific structure of the first driving member 92 may be in other manners, and the first driving bolt 921 may be of other rotational structures, such as a cam structure.

Preferably, the first driving member 92 further includes a first reset spring 923. Two ends of the first reset spring 923 are connected to the driving rack 922 and the output mechanism 30 respectively, and the first reset spring 923 provides a restoring force to the driving rack 922 by its own resilience. That is, the first reset spring 923 is configured to provide a force, opposite to the action of the first driving bolt 921, to the driving rack 922, such that when the rider adjusts the first driving bolt 921 to get close to the driving rack 922, the first reset spring 923 is compressed; and when the rider adjusts the first driving bolt 921 to get away from the driving rack 922, the first reset spring 923 can extend by its own resilience, to drive the driving rack 922 to move toward the side where the first driving bolt 921 is located. In this way, when the rider adjusts the first driving bolt 921 in a forward direction, the first driving bolt 921 drives the driving rack 922 to move toward the side where the first reset spring 923 is located, whereby the driving rack 922 drives the first adjustment member 91 to twist and compress the first resilient reset member 60. When the rider adjusts the first driving bolt 921 in a reverse direction, the first reset spring 923 drives the driving rack 922 to move toward the side where the first driving bolt 921 is located, whereby the driving rack 922 drives the first adjustment member 91 to release the first resilient reset member 60. The resilience of the first resilient reset member 60 can be adjusted simply by adjusting the first driving bolt 921, which makes the adjustment more convenient and easier, and leads to the simpler structure, better reliability, and smaller space occupation as well.

Preferably, the second adjustment member 111 is rotatably connected to the output mechanism 30, and the second resilient reset member 70 is a torsion spring. The second driving member 112 is able to drive the second adjustment member 111 to rotate, so as to twist the second resilient reset member 70. That is, in the present embodiment, the second restoring force is applied to the second centrifugal block 52 through the torsional force of the second resilient reset member 70. Furthermore, the second adjustment member 111 is connected to the output mechanism 30, and the second adjustment member 111 can rotate with respect to the output mechanism 30, to twist the second resilient reset member 70 to change the torsional force of the second resilient reset member 70. Certainly, in other embodiments, the second resilient reset member 70 may be other resilient components, such as a tension spring, a compression spring or the like. Alternatively, the second adjustment member 111 may be slidably arranged on the output mechanism 30, so that the second adjustment member 111 can be driven to move to change the deformed state of the second resilient reset member 70. In the present embodiment, the second resilient reset member 70 is a torsion spring, and the second adjustment member 111 is rotatably connected to the output mechanism 30, such that the overall structure is simpler, and the space occupied is smaller, which facilitates arrangement and improves the stability of the control process.

Preferably, the second adjustment member 111 is provided with a second gear 1111, and the second driving member 112 is engaged with the second gear 1111. That is to say, both the second adjustment member 111 and the second driving member 112 are provided with teeth, and the second driving member 112 is engaged with the second gear 1111, which better ensures the second driving member 112 to drive the second adjustment member 111, and better ensures the second driving member 112 to drive the second adjustment member 111 to rotate, thereby ensuring the stability of the control process. Meanwhile, accidental slide between the second driving member 112 and the second adjustment member 111 is prevented, which better ensures that the position state of the second adjustment member 111 can be kept after being adjusted in position.

Preferably, the second driving member 112 includes a second driving bolt 1121 and a second driving assembly 1122. The output mechanism 30 is provided with a second threaded hole 32, and the second driving bolt 1121 is correspondingly mounted at the second threaded hole 32. The second driving assembly 1122 is engaged with the second gear 1111, and the second driving bolt 1121 is able to drive the second driving assembly 1122 to move, so as to drive the second adjustment member 111 to rotate. That is, the second driving bolt 1121 is mounted in the second threaded hole 32, such that the second driving bolt 1121 can move when being screwed, to further drive the second driving assembly 1122 to work, making the second adjustment member 111 rotate. In the second driving member 112 provided in the present embodiment, the second driving bolt 1121 is in fit with the second threaded hole 32, and the second driving assembly 1122 drives the second adjustment member 111, to make the second driving member 112 be self-locked. After adjustment, threaded connection between the second driving bolt 1121 and the second threaded hole 32 can prevent the second driving assembly 1122 from moving back, which better ensures the reliability and effectiveness of the adjustment. That is to say, in the present embodiment, the second driving member 112 is of a manually driving structure, such that the rider can adjust the automatic internal transmission 100 simply by manually screwing the second driving bolt 1121. The structure is simple and reliable, and the cost is effectively reduced. Certainly, in other embodiments, the specific structure of the second driving member 112 may be in any other manners, such as a cam structure.

Preferably, the second driving assembly 1122 includes an oscillating gear 11221 and an intermediate gear 11222. The oscillating gear 11221 is rotatably connected to the output mechanism 30. The intermediate gear 11222 is rotatably connected to the output mechanism 30, and the intermediate gear 11222 is engaged with the oscillating gear 11221 and the second gear 1111 respectively. The second driving bolt 1121 is able to drive the oscillating gear 11221 to oscillate, to drive the intermediate gear 11222 to rotate, so as to rotate the second adjustment member 111. That is, the oscillating gear 11221 and the intermediate gear 11222 are both mounted to the output mechanism 30, and the oscillating gear 11221 and the intermediate gear 11222 are both rotatable with respect to the output mechanism 30. In this way, when the rider adjusts the second driving bolt 1121, the second driving bolt 1121 drives the oscillating gear 11221 to swing, and the swinging oscillating gear 11221 drives the intermediate gear 11222 to rotate, enabling the intermediate gear 11222 to drive the second adjustment member 111 to rotate, so as to adjust the torsional force of the second resilient reset member 70.

Preferably, the second driving member 112 further includes a second reset torsion spring 1123. The oscillating gear 11221 and the output mechanism 30 are connected to two ends of the second reset torsion spring 1123 respectively, and the second reset torsion spring 1123 is configured to provide a restoring force to the oscillating gear 11221 by its own resilience. That is, the second reset torsion spring 1123 is configured to provide a force, opposite to the action of the second driving bolt 1121, to the oscillating gear 11221, such that when the rider adjusts the second driving bolt 1121 to get close to the oscillating gear 11221, the second reset torsion spring 1123 is compressed; and when the rider adjusts the second driving bolt 1121 to get away from the oscillating gear 11221, the second reset torsion spring 1123 can extend by its own resilience, to drive the oscillating gear 11221 to move toward the side where the second driving bolt 1121 is located. In this way, when the rider adjusts the second driving bolt 1121 in a forward direction, the second driving bolt 1121 drives the oscillating gear 11221 to swing in a forward direction, whereby the oscillating gear 11221 drives the intermediate gear 11222 to rotate, to make the second resilient reset member 70 be twisted and compressed by the first adjustment member 59. When the rider adjusts the second driving bolt 921 in a reverse direction, the second reset torsion spring 1123 drives the oscillating gear 11221 to swing in a reverse direction, whereby the oscillating gear 11221 drives the intermediate gear 11222 to rotate, to make the second resilient reset member 70 be released by the first adjustment member 59. The resilience of the second resilient reset member 70 can be adjusted simply by adjusting the second driving bolt 1121, which makes the adjustment more convenient and easier, and leads to the simpler structure, better reliability, and smaller space occupation as well.

Preferably, the output mechanism 30 includes a hub body 33 and a mounting base 34. The mounting base 34 is fixedly connected to the hub body 33, the first resilient force adjustment structure 90 and the second resilient force adjustment structure 110 are both connected to the mounting base 34, and the centrifugal blocks 501 are rotatably connected to the mounting base 34. In this way, components are better supported via the mounting base 34, the components are kept in position, and the stability of the components during adjustment is ensured.

Preferably, the mounting base 34 is provided with a slide groove 342, an opening 341 is provided at an end of the slide groove 342, and the slide groove 342 extends along a rotation direction of the second centrifugal block 52. The second centrifugal block 52 includes a centrifugal block body 521 and a centrifugal block protrusion 522, the centrifugal block body 521 is rotatably connected to the mounting base 34, and the centrifugal block protrusion 522 is connected to the centrifugal block body 521. The damping member 80 and the centrifugal block body 521 are arranged in a staggered manner along the axial direction, and the centrifugal block protrusion 522 is located in the slide groove 342. When the second centrifugal block 52 rotates when being subjected to the centrifugal force, the centrifugal block protrusion 522 is able to slide out of the slide groove 342 through the opening 341. The damping member 80 is located at the opening 341 for stopping the centrifugal block protrusion 522. In this way, the position of the second centrifugal block 52 can be better guided by the slide groove 342, the overall structure becomes more compact, which saves the arrangement space. Specifically, in the present embodiment, in the first state, the centrifugal block protrusion 522 is exactly located at the opening 341 and is stopped by the damping member 80, which better ensures the stability of the second gear.

Preferably, the automatic internal transmission 100 further includes a damping member attraction unit 120. The damping member attraction unit 120 is connected to the mounting base 34. The damping member attraction unit 120 is configured to attract the damping member 80, to make the damping member 80 be at an initial position. That is, the damping member attraction unit 120 provides an attraction force to the damping member 80, such that the damping member 80 is at the initial position for stopping the second centrifugal block 52. In the present embodiment, specifically, the damping member attraction unit 120 is located at a region of the first state where the second centrifugal block is partially "thrown out", i.e. being close to the opening 341. That is to say, the damping member attraction unit 120 is located at a region where the second centrifugal block 52 is located when the automatic internal transmission 100 is at the second gear. In the present embodiment, the damping member attraction unit 120 is an iron member. The damping member 80 has a magnet 81, such that the damping member attraction unit 120 is attracted by the damping member 80 through a magnetic force. Certainly, in other embodiments, the damping member attraction unit 120 may be a magnet, while the damping member 80 has an iron member, such that the damping member attraction unit 120 attracts the damping member 80. The iron member may be made of any other materials that can be attracted by a magnet, as long as the damping member attraction unit 120 can apply an attraction force to the damping member 80 to keep the damping member 80 at the initial position.

In the present embodiment, with the damping member attraction unit 120, when the automatic internal transmission 100 shifts from the third gear to the second gear, the damping member attraction unit 120 applies the attraction force to the damping member 80, which makes the shifting from the third gear to the second gear faster, which reduces the shifting time. It may be appreciated that, if the damping member attraction unit 120 is not provided, the torsion of the second resilient reset member 70 is required to be adjusted, so as to accelerate the shifting from the third gear to the second gear. However, increase of the torsion of the second resilient reset member 70 will make the shifting from the second gear to the third gear harder, and the centrifugal force has to overcome a larger second restoring force. In the present embodiment, the damping member attraction unit 120 applies the magnetic attraction force to the damping member 80, which effectively solves the problem. During the shifting from the second gear to the third gear, the centrifugal force only needs to overcome the magnetic force applied to the damping member 80 by the damping member attraction unit 120 in the beginning, and the resistance will not last after the damping member 80 and the damping member attraction unit 120 are separated apart, which reduces the impact to the shifting from the second gear to the third gear as much as possible. Furthermore, the damping member attraction unit 120 can make the second centrifugal block 52 to be more stably kept at the second gear position, which makes the gears of the automatic internal transmission 100 more precise.

Preferably, in the first state, the second centrifugal block protrusion 522 is located close to the opening 341, and the damping member attraction unit 120 may be used to further attract the centrifugal block protrusion 522. Specifically, the centrifugal block protrusion 562 has a magnet, or the centrifugal block protrusion 562 is made of a magnet, such that the damping member attraction unit 120 can also provide a magnetic attraction force to the centrifugal block protrusion 562, to keep the second centrifugal block 52 at the second gear state stably, thereby making the shifting from the first gear to the second gear faster, and the gears more precise.

Preferably, the automatic internal transmission 100 further includes a centrifugal block attraction unit 130. The centrifugal block attraction unit 130 is connected to the output mechanism 30, and the centrifugal block attraction unit 130 is configured to attract the centrifugal block 501, to make the centrifugal block 501 be kept in the second state. That is, the centrifugal block attraction unit 130 is mounted to the output mechanism 30 and configured to attract the centrifugal block 501, to make the centrifugal block 501 be kept at a completely "thrown out" state, such that the automatic internal transmission 100 is kept in the third gear state. Specifically, in the present embodiment, the centrifugal block attraction unit 130 is located close to a region where the centrifugal block 501 is completely "thrown out", i.e. the centrifugal block attraction unit 130 is located at a region where the centrifugal block 501 is in the third gear state. The centrifugal block attraction unit 130 is provided with a magnet 131 for the third gear, and an iron member is provided at a corresponding region of the centrifugal block 501. In this way, when the centrifugal block 501 rotates to the third gear state due to the action of the centrifugal force, the centrifugal block attraction unit 130 attracts the centrifugal block 501 through a magnetic force, and keeps the centrifugal block 501 in the third gear state, which makes the third gear state of the automatic internal transmission 100 more stable and precise. Certainly, in other embodiments, the centrifugal block attraction unit 130 may be provided with an iron member, while the centrifugal block 501 may be provided with a magnet. The iron member may be made of any other materials that can be attracted by the magnet, as long as the centrifugal block attraction unit 130 can apply an attraction force to the centrifugal block 501 and keeps the centrifugal block 501 in the second state.

Second Embodiment

Please refer to FIGS. 24 to 27 in conjunction. An automatic internal transmission 200 is provided in the present embodiment, which is basically the same as the automatic internal transmission 100 in the first embodiment, with the main difference lying in the specific structure of a first driving member 210.

The first driving member 210 includes a rotation plate 220, a connecting rod 230 and a rotation plate driving rod 240. The rotation plate 220 is connected to an output mechanism 250, and the rotation plate 220 is connected to a first adjustment member 260 via the connecting rod 230. The rotation plate driving rod 240 is movably mounted to the output mechanism 250, and the rotation plate driving rod 240 is able to drive the rotation plate 220 to rotate, to enable the connecting rod 230 to drive the first adjustment member 260 to rotate. In this way, the rotation plate driving rod 240 provides a driving force, to drive the rotation plate 220 to rotate, the rotation plate 220 drives the connecting rod 230 to move, and the connecting rod 230 drives the first adjustment member 260 to rotate, to realize adjustment of the first resilient reset member connected to the first adjustment member 260. In the present embodiment, the first resilient reset member is a torsion spring, and the first resilient reset member is directly connected to the centrifugal block. Alternatively, the first resilient reset member may provide a first restoring force indirectly to the centrifugal block (for example, the first resilient reset member is connected to other components such as a damping member, a clutch control unit or the like).

Preferably, the connecting rod 230 is connected to one end of the rotation plate 220, and a worm wheel structure 270 is provided at the other end of the rotation plate 220. The rotation plate driving rod 240 includes a worm 280 and a driving rod 290, and the worm 280 is engaged with the worm wheel structure 270. The driving rod 290 is connected to the worm 280, and the driving rod 290 is movably mounted to the output mechanism 250. The driving rod 290 drives the worm 280 to rotate, such that the worm 280 is in cooperation with the worm wheel structure 270 to drive the rotation plate 220 to rotate. That is, in the present embodiment, the rotation plate driving rod 240 drives the rotation plate 220 specifically by the worm and worm wheel which better ensures mutual locking of structures, and better ensures precision and stability of control.

Specifically, in the present embodiment, the specific connection structure between the driving rod 290 and the worm 280 is that, a mounting groove 281 is provided at an end of the worm 280, a mounting portion 291 corresponding to the mounting groove 281 is provided at an end of the driving rod 290, and the mounting portion 291 is inserted in the mounting groove 281, which facilitates the connection between the driving rod 290 and the worm 280, and better ensures transmission stability.

Preferably, the output mechanism 250 is provided with a mounting hole 251, and the driving rod 290 is mounted in the mounting hole 251. Specifically, the mounting hole 251 is provided in the hub or an end cover. A seal ring 292 is mounted on the driving rod 290, and the driving rod 290 is in an interference fit with a hole wall of the mounting hole 251 via the seal ring 292, which better ensures the position of the driving rod 290, and prevents the driving rod 290 from moving or sliding.

Specifically, in the present embodiment, a seal ring mounting position 293 is provided on the driving rod 290, and the seal ring 292 is correspondingly mounted at the seal ring mounting position 293. The worm 280, the rotation plate 220 and the connecting rod 230 are all arranged on a mounting base, which is connected to the hub, in the output mechanism 250. Certainly, in other embodiments, the worm 280, the rotation plate 220 and the connecting rod 230 may be arranged on other structures connected to the hub. In the automatic internal transmission 200 provided by the present embodiment, there is no relative displacement between the mounting base and the hub or the end cover. The assembling of the worm 280, the rotation plate 220 and the connecting rod 230 that are mounted on the mounting base and the assembling of the driving rod 290 mounted on the hub or the end cover may be performed separately, which facilitates the assembly and reduces the mounting difficulty.

Third Embodiment

Figure 28:
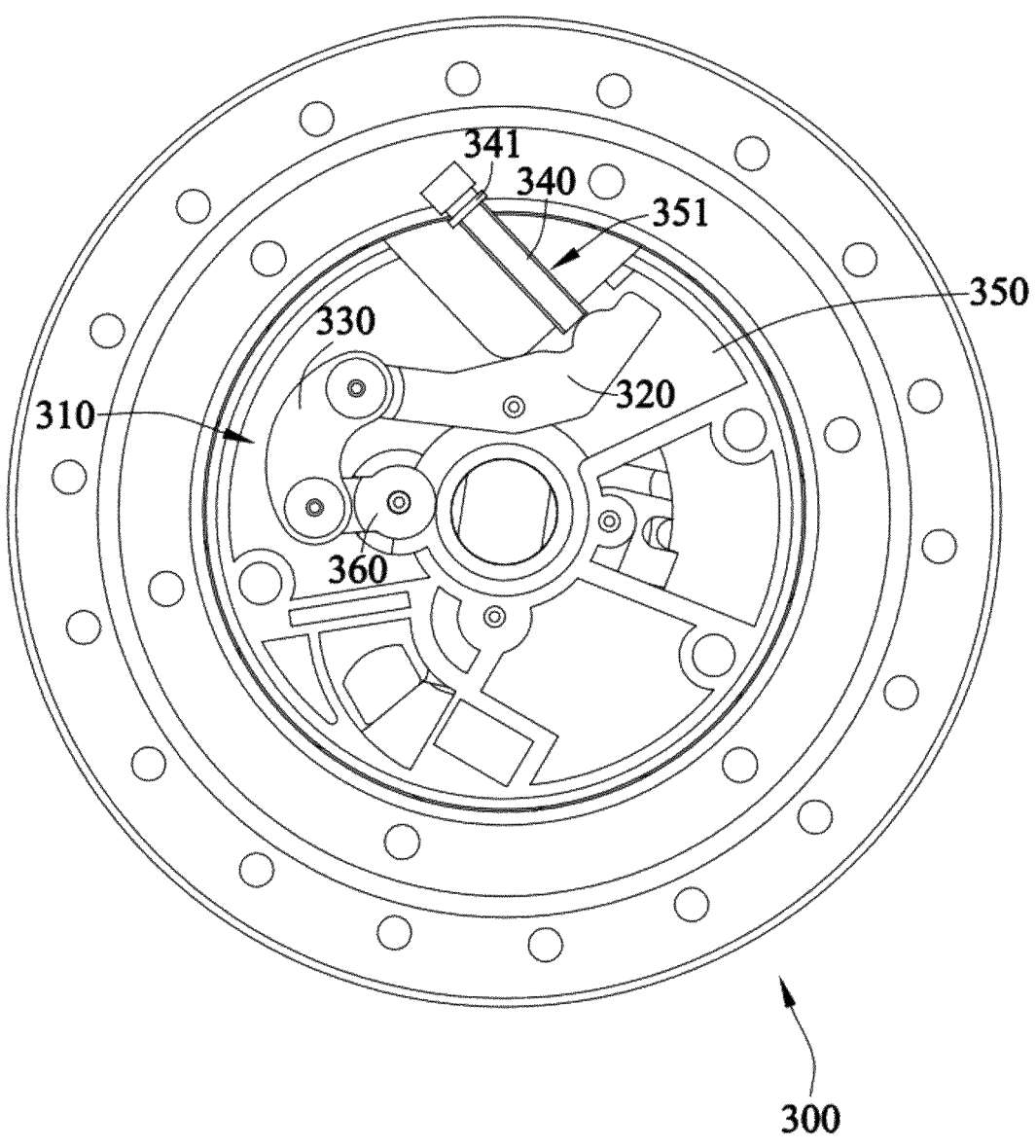
FIG. 28 is a schematic planar view showing the structure of a part of components of an automatic internal transmission according to yet another embodiment.
Figure 29:
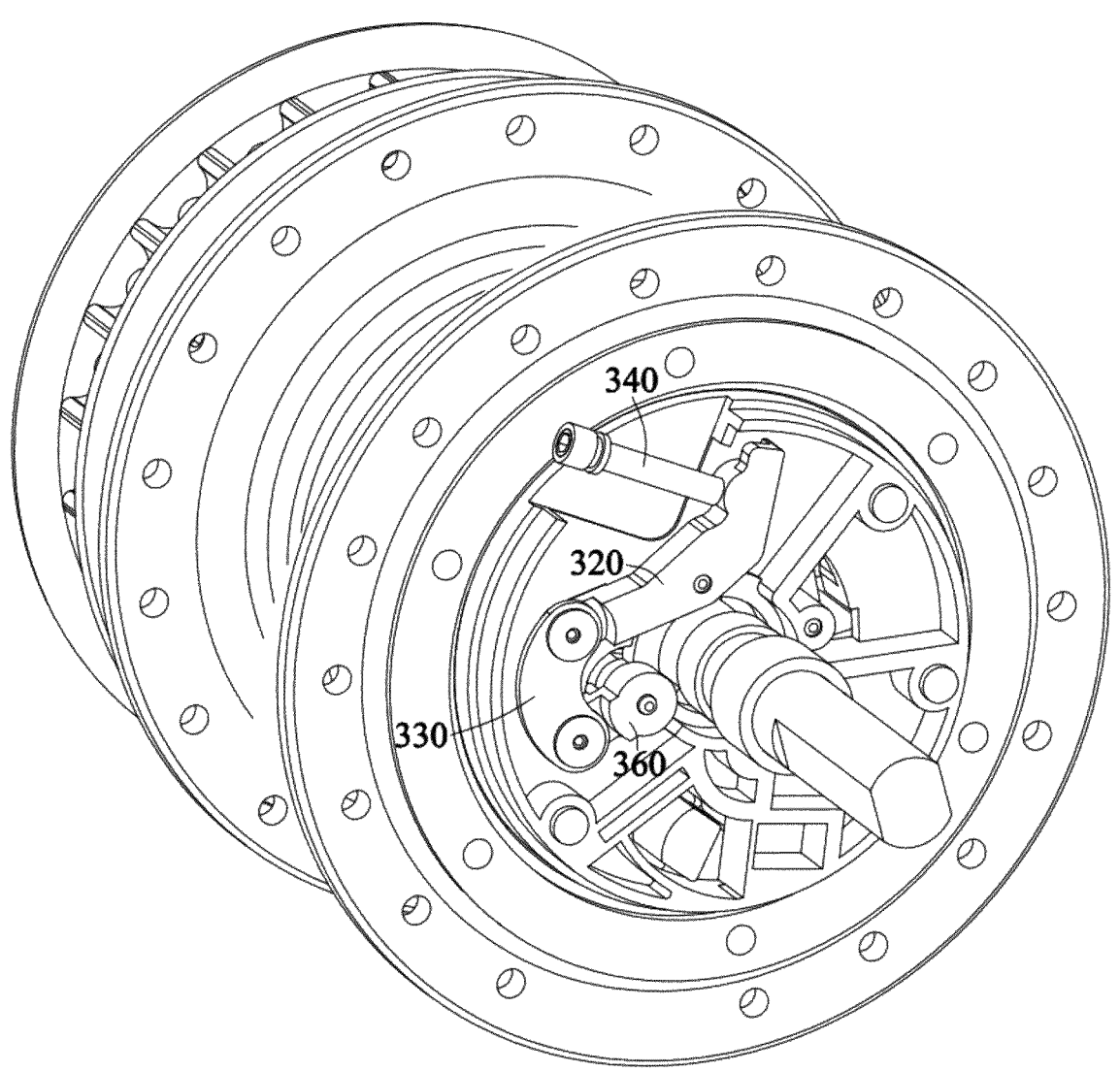
FIG. 29 is a schematic perspective view showing the structure of the part of components of the automatic internal transmission in FIG. 28.

Please refer to FIGS. 28 and 29 in conjunction. An automatic internal transmission 300 is provided in the present embodiment, which is basically the same as the automatic internal transmission 100 in the first embodiment and the automatic internal transmission 200 in the second embodiment, with the main difference lying in the specific structure of a first driving member 310.

The first driving member 310 includes a rotation plate 320, a connecting rod 330 and a rotation plate driving rod 340. The rotation plate 320 is rotatably connected to an output mechanism 350, and the rotation plate 320 is connected to a first adjustment member 360 via the connecting rod 330. The rotation plate driving rod 340 is movably mounted to the output mechanism 350, and the rotation plate driving rod 340 is configured to drive the rotation plate 320 to rotate, to enable the connecting rod 330 to drive the first adjustment member 360 to rotate. In this way, the rotation plate driving rod 340 provides a driving force, to drive the rotation plate 320 to rotate, the rotation plate 320 drives the connecting rod 330 to move, and the connecting rod 330 in turn drives the first adjustment member 360 to rotate, so as to adjust a first resilient reset member connected to the first adjustment member 360. In the present embodiment, the first resilient reset member is a torsion spring, and the first resilient reset member is directly connected to the centrifugal block. Alternatively, the first resilient reset member may provide a first restoring force indirectly to the centrifugal block (for example, the first resilient reset member is connected to another component such as a damping member, a clutch control unit or the like).

Preferably, the rotation plate driving rod 340 is a bolt, the output mechanism 350 is provided with a first threaded hole 351, and the rotation plate driving rod 340 is correspondingly mounted at the first threaded hole 351. By screwing the rotation plate driving rod 340, the rotation plate driving rod 340 moves, and the rotation plate 320 is driven by the rotation plate driving rod 340 to rotate, to enable the connecting rod 330 to drive the first adjustment member 360 to rotate. In the first driving member 310 provided in the present embodiment, the rotation plate driving rod 340 is in fit with the first threaded hole 351, which enables the first driving member 310 to be self-locked. After adjustment, threaded connection between the rotation plate driving rod 340 and the first threaded hole 351 can prevent the first driving member 310 from moving back, which better ensures the reliability and effectiveness of adjustment. Preferably, the rotation plate 320 and the output mechanism 350 may be directly provided with a torsion spring, to better drive the rotation plate 320 to be reset. Preferably, a seal ring 341 is arranged at an end of the rotation plate driving rod 340.

Fourth Embodiment

A bicycle is further provided in the present embodiment. The bicycle includes a bicycle body and an automatic internal transmission, the automatic internal transmission is the above automatic internal transmission 100, or the above automatic internal transmission 200, or the above automatic internal transmission 300. The automatic internal transmission is mounted to a driving wheel of the bicycle body. It should be noted that, the bicycle may be a conventional bicycle, such as a conventional two-wheel bicycle, where the driving force is outputted to a rear wheel by pedaling of the rider. The automatic internal transmission is mounted at the rear wheel of the conventional bicycle in specific. Certainly, the bicycle may be a power-assisted bicycle, i.e. the bicycle is provided with an apparatus supplying an additional power, to decrease the cycling difficulty for the rider. For example, an electric assist bicycle is assisted by additional electric power. Certainly, the power source of the power-assisted bicycle is not limited to electric power, and may be power sources of other forms. The number of wheels of the bicycle is not limited to two, it can be selected according to actual needs instead.

The description hereinabove are only embodiments of the present application. It should be noted that, for those skilled in the art, improvements may be made to the present application without departing from the inventive concept of the present application, and all of these improvements belong to the scope of protection of the present application.

The invention claimed is:

1. An automatic internal transmission, comprising a hub shaft, an input mechanism, an output mechanism, a transmission mechanism and an automatic shift control mechanism, wherein the input mechanism and the output mechanism are both rotatably mounted to the hub shaft, and the input mechanism is configured to provide a driving force to drive the output mechanism to rotate;

the transmission mechanism is mounted to the hub shaft, and is located between the input mechanism and the output mechanism; wherein the transmission mechanism at least comprises a first planetary gear train and a second planetary gear train;

the automatic shift control mechanism comprises a centrifugal block and a clutch control unit, the centrifugal block is rotatably connected to the output mechanism, and the centrifugal block is connected to the clutch control unit;

the centrifugal block is configured to rotate with respect to the output mechanism along a first direction to a first state, to drive the clutch control unit to rotate, to make the driving force transmitted by the input mechanism be transmitted to the output mechanism via the first planetary gear train; and the centrifugal block is configured to further rotate with respect to the output mechanism along the first direction to a second state, to drive the clutch control unit to further rotate, to make the driving force transmitted by the input mechanism be transmitted to the output mechanism via the second planetary gear train; and wherein the clutch control unit comprises a clutch controller, a synchronization ring and a control sleeve, wherein the centrifugal block is connected to the synchronization ring, the control sleeve is connected to the synchronization ring, the clutch controller is located between the transmission mechanism and the output mechanism, and the centrifugal block is configured to drive the synchronization ring to rotate, so as to drive the control sleeve to rotate to control the clutch controller.

2. The automatic internal transmission according to claim 1, wherein in the first state, the control sleeve is configured to control the clutch controller to combine the first planetary gear train with the output mechanism; and in the second state, the control sleeve is configured to control the clutch controller to combine the second planetary gear train with the output mechanism.

3. An automatic internal transmission, comprising a hub shaft, an input mechanism, an output mechanism, a transmission mechanism and an automatic shift control mechanism, wherein the input mechanism and the output mechanism are both rotatably mounted to the hub shaft, and the input mechanism is configured to provide a driving force to drive the output mechanism to rotate;

the transmission mechanism is mounted to the hub shaft, and is located between the input mechanism and the output mechanism; wherein the transmission mechanism at least comprises a first planetary gear train and a second planetary gear train;

the automatic shift control mechanism comprises a centrifugal block and a clutch control unit, the centrifugal block is rotatably connected to the output mechanism, and the centrifugal block is connected to the clutch control unit;

the centrifugal block is configured to rotate with respect to the output mechanism along a first direction to a first state, to drive the clutch control unit to rotate, to make the driving force transmitted by the input mechanism be transmitted to the output mechanism via the first planetary gear train; and the centrifugal block is configured to further rotate with respect to the output mechanism along the first direction to a second state, to drive the clutch control unit to further rotate, to make the driving force transmitted by the input mechanism be transmitted to the output mechanism via the second planetary gear train; and wherein the clutch control unit comprises a clutch controller and a control sleeve, the clutch controller comprises a hub bush, a first pawl and a second pawl, the hub bush is connected to the output mechanism, and the first pawl and the second pawl are each rotatably connected to the hub bush;

pawl mounting grooves are provided in an inner surface of the hub bush, and the first pawl and the second pawl are mounted in the pawl mounting grooves respectively; wherein in the first state, the control sleeve is configured to control the first pawl to be combined with the first planetary gear train; and in the second state, the control sleeve is configured to control the second pawl to be combined with the second planetary gear train.

4. The automatic internal transmission according to claim 3, wherein the first pawl and the second pawl are arranged spaced apart from each other along an axial direction, the control sleeve is provided with a first control groove and a second control groove, wherein the first control groove runs through the control sleeve in a radial direction, and the first control groove is arranged in correspondence to the first pawl in the axial direction; the second control groove runs through the control sleeve in the radial direction, and the second control groove is arranged in correspondence to the second pawl in the axial direction; wherein in the first state, an inner wall of the first control groove abuts against the first pawl to press the first pawl downwards, to make the first pawl pass through the first control groove to be combined with the first planetary gear train; and in the second state, an inner wall of the second control groove abuts against the second pawl to press the second pawl downwards, to make the second pawl pass through the second control groove to be combined with the second planetary gear train.

5. The automatic internal transmission according to claim 2, wherein the synchronization ring comprises a synchronization ring body, a centrifugal block connection protrusion and a control sleeve connection protrusion; and wherein the centrifugal block connection protrusion is provided at one end of the synchronization ring body in an axial direction, and the centrifugal block is connected to the centrifugal block connection protrusion; and the control sleeve connection protrusion is provided at the other end of the synchronization ring body in the axial direction, and the control sleeve is connected to the control sleeve connection protrusion.

6. The automatic internal transmission according to claim 1, further comprising a first resilient reset member, wherein the first resilient reset member is connected to the output mechanism, and is configured to provide a first restoring force, via its own resilience, to the centrifugal block, to make the centrifugal block be restored along a second direction and kept in an initial state; wherein the second direction and the first direction are two opposite directions.

7. The automatic internal transmission according to claim 6, further comprising a first resilient force adjustment structure, wherein the first resilient reset member is connected to the output mechanism via the first resilient force adjustment structure;

the first resilient force adjustment structure comprises a first adjustment member and a first driving member, the first adjustment member is connected to the first resilient reset member, the first driving member is connected to the output mechanism, and the first driving member is connected to the first adjustment member; and the first driving member is configured to drive the first adjustment member to work, to change a deformed state of the first resilient reset member, so as to change the first restoring force acting on the centrifugal block.

8. The automatic internal transmission according to claim 7, wherein the first adjustment member is rotatably connected with the output mechanism, the first resilient reset member is a torsion spring, and the first driving member is configured to drive the first adjustment member to rotate, so as to twist the first resilient reset member.

9. The automatic internal transmission according to claim 8, wherein the first adjustment member is provided with a first gear, and the first driving member is engaged with the first gear;

the first driving member comprises a first driving bolt and a driving rack, the output mechanism is provided with a first threaded hole, the first driving bolt is correspondingly mounted at the first threaded hole, the driving rack is engaged with the first gear, and the first driving bolt is configured to drive the driving rack to move, so as to drive the first adjustment member to rotate; and the first driving member further comprises a first reset spring, wherein two ends of the first reset spring are connected to the driving rack and the output mechanism respectively, and the first reset spring is configured to provide a restoring force, via its own resilience, to the driving rack.

10. The automatic internal transmission according to claim 8, wherein the first driving member comprises a rotation plate, a connecting rod and a rotation plate driving rod, the rotation plate is rotatably connected to the output mechanism, and the rotation plate is connected to the first adjustment member via the connecting rod; and the rotation plate driving rod is movably mounted to the output mechanism, and the rotation plate driving rod is configured to drive the rotation plate to rotate, so as to make the connecting rod drive the first adjustment member to rotate;

the connecting rod is connected to one end of the rotation plate, and a worm wheel structure is provided at another end of the rotation plate, the rotation plate driving rod comprises a worm and a driving rod, the worm is engaged with the worm wheel structure, the driving rod is connected to the worm, the driving rod is movably mounted to the output mechanism, and the driving rod is configured to drive the worm to rotate, so as to drive the rotation plate to rotate by cooperation between the worm and the worm wheel structure; and the output mechanism is provided with a mounting hole, the driving rod is mounted in the mounting hole, a seal ring is mounted to the driving rod, and the driving rod is in an interference fit with a hole wall of the mounting hole via the seal ring.

11. The automatic internal transmission according to claim 8, wherein the first driving member comprises a rotation plate, a connecting rod and a rotation plate driving rod, the rotation plate is rotatably connected to the output mechanism, and the rotation plate is connected to the first adjustment member via the connecting rod;

the rotation plate driving rod is movably mounted to the output mechanism, and the rotation plate driving rod is configured to drive the rotation plate to rotate, so as to make the connecting rod drive the first adjustment member to rotate; and the rotation plate driving rod is a bolt, the output mechanism is provided with a first threaded hole, and the rotation plate driving rod is correspondingly mounted at the first threaded hole.

12. The automatic internal transmission according to claim 7, wherein two ends of the first resilient reset member are connected to the first adjustment member and the centrifugal block respectively.

13. The automatic internal transmission according to claim 7, further comprising a second resilient reset member and a damping member, wherein two ends of the second resilient reset member are connected to the damping member and the output mechanism respectively, the damping member is configured to stop the centrifugal block, and the damping member is configured to provide a second restoring force, via resilience of the second resilient reset member, to the centrifugal block, to make the centrifugal block be restored along the second direction and kept in the first state.

14. The automatic internal transmission according to claim 13, further comprising a second resilient force adjustment structure, wherein the second resilient reset member is connected to the output mechanism via the second resilient force adjustment structure;

the second resilient force adjustment structure comprises a second adjustment member and a second driving member, the second adjustment member is connected to the second resilient reset member, the second driving member is connected to the output mechanism, and the second driving member is connected to the second adjustment member; and the second driving member is configured to drive the second adjustment member to work, to change a deformed state of the second resilient reset member, so as to change the second restoring force acting on the centrifugal block by the damping member.

15. The automatic internal transmission according to claim 14, wherein the second adjustment member is rotatably connected to the output mechanism, the second resilient reset member is a torsion spring, and the second driving member is configured to drive the second adjustment member to rotate, so as to twist the second resilient reset member.

16. The automatic internal transmission according to claim 15, wherein the second adjustment member is provided with a second gear, and the second driving member is engaged with the second gear;

the second driving member comprises a second driving bolt and a second driving assembly, the output mechanism is provided with a second threaded hole, the second driving bolt is correspondingly mounted at the second threaded hole, the second driving assembly is engaged with the second gear, and the second driving bolt is configured to drive the second driving assembly to work, to drive the second adjustment member to rotate;

the second driving assembly comprises an oscillating gear and an intermediate gear, the oscillating gear is rotatably connected to the output mechanism, and the intermediate gear is rotatably connected to the output mechanism; and the intermediate gear is engaged with the oscillating gear and the second gear respectively, and the second driving bolt is configured to drive the oscillating gear to oscillate to drive the intermediate gear to rotate, so as to rotate the second adjustment member; and the second driving member further comprises a second reset torsion spring, two ends of the second reset torsion spring are connected to the oscillating gear and the output mechanism respectively, and the second reset torsion spring is configured to provide a restoring force, via its own resilience, to the oscillating gear.

17. The automatic internal transmission according to claim 14, wherein the output mechanism comprises a hub body and a mounting base, the mounting base is fixedly connected to the hub body, the first resilient force adjustment structure and the second resilient force adjustment structure are both connected to the mounting base, and the centrifugal block is rotatably connected to the mounting base.

18. The automatic internal transmission according to claim 17, wherein the mounting base is provided with a slide groove, an opening is provided at an end of the slide groove, and the slide groove extends along a rotational direction of the centrifugal block, wherein the centrifugal block comprises a centrifugal block body and a centrifugal block protrusion, the centrifugal block body is rotatably connected to the mounting base, the centrifugal block protrusion is connected to the centrifugal block body, the damping member and the centrifugal block body are arranged in a staggered manner along an axial direction;

the centrifugal block protrusion is located in the slide groove, and the centrifugal block protrusion is allowed to slide out of the slide groove through the opening when the centrifugal block is rotated under a centrifugal force; and the damping member is correspondingly located at the opening, and is configured to stop the centrifugal block protrusion;

the automatic internal transmission further comprises a damping member attraction unit, wherein the damping member attraction unit is connected to the mounting base and is proximate to the opening, and the damping member attraction unit is configured to attract the damping member, to make the damping member be at an initial position; and wherein in the first state, the centrifugal block protrusion is proximate to the opening, and the damping member attraction unit is further configured to attract the centrifugal block protrusion.

19. The automatic internal transmission according to claim 1, further comprising a centrifugal block attraction unit, wherein the centrifugal block attraction unit is connected to the output mechanism, and is configured to attract the centrifugal block, to keep the centrifugal block in the second state.

20. A bicycle, comprising a bicycle body, and the automatic internal transmission according to claim 1, wherein the automatic internal transmission is mounted to a driving wheel of the bicycle body.

* * * * *